US007971108B2

(12) United States Patent
Zopf et al.

(10) Patent No.: US 7,971,108 B2
(45) Date of Patent: Jun. 28, 2011

(54) MODEM-ASSISTED BIT ERROR CONCEALMENT FOR AUDIO COMMUNICATIONS SYSTEMS

(75) Inventors: Robert W. Zopf, Rancho Santa Margarita, CA (US); Siukai Mak, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 77 days.

(21) Appl. No.: 12/506,727

(22) Filed: Jul. 21, 2009

(65) Prior Publication Data

US 2011/0022904 A1 Jan. 27, 2011

(51) Int. Cl.
*G06F 11/00* (2006.01)

(52) U.S. Cl. ........................................................ 714/704

(58) Field of Classification Search .................. 714/704, 714/776, 799; 375/226; 704/500

See application file for complete search history.

(56) References Cited

U.S. PATENT DOCUMENTS

| | | | | |
|---|---|---|---|---|
| 6,261,250 | B1 * | 7/2001 | Phillips | 601/23 |
| 7,398,452 | B2 | 7/2008 | Kim et al. | |
| 2009/0281797 | A1 * | 11/2009 | Zopf et al. | 704/207 |
| 2009/0282298 | A1 * | 11/2009 | Zopf et al. | 714/701 |

* cited by examiner

*Primary Examiner* — Phung M Chung
(74) *Attorney, Agent, or Firm* — Fiala & Weaver P.L.L.C.

(57) ABSTRACT

Systems and methods are described for managing bit errors present in a series of encoded bits representative of a portion of an audio signal, wherein the series of encoded bits is received over a communication link in an audio communications system. At least one characteristic of a portion of a received modulated carrier signal that is demodulated to produce the series of encoded bits is determined. A number of bit errors present in the series of encoded bits is then determined based on the at least one characteristic. Based on the estimated number of bit errors, one of a plurality of methods for producing a series of digital audio samples representative of the portion of the audio signal is selectively performed. The series of digital audio samples produced by the selected method is then converted into a form suitable for playback to a user.

21 Claims, 14 Drawing Sheets

400

MODEM-ASSISTED BIT ERROR CONCEALMENT FOR AUDIO COMMUNICATIONS SYSTEMS

BACKGROUND OF THE INVENTION

1. Field of the Invention

The invention generally relates to systems and methods for improving the quality of an audio signal transmitted within an audio communications system.

2. Background

In audio coding (sometimes called "audio compression"), a coder encodes an input audio signal into a digital bit stream for transmission. A decoder decodes the bit stream into an output audio signal. The combination of the coder and the decoder is called a codec. The transmitted bit stream is usually partitioned into frames, and in packet transmission networks, each transmitted packet may contain one or more frames of a compressed bit stream. In wireless or packet networks, sometimes the transmitted frames or the packets are erased or lost. This condition is often called frame erasure in wireless networks and packet loss in packet networks. Frame erasure and packet loss may result, for example, from corruption of a frame or packet due to bit errors. For example, such bit errors may prevent proper decoding of the bit stream or may be detected by a forward error correction (FEC) scheme and the frame or packet discarded.

It is well known that bit errors can occur in any audio communications system. The bit errors may be random or bursty in nature. Generally speaking, random bit errors have an approximately equal probability of occurring over time, whereas bursty bit errors are more concentrated in time. As previously mentioned, bit errors may cause a packet to be discarded. In many conventional audio communications systems, packet loss concealment (PLC) logic is invoked at the decoder to try and conceal the quality-degrading effects of the lost packet, thereby avoiding substantial degradation in output audio quality. However, bit errors may also go undetected and be present in the bit stream during decoding. Some codecs are more resilient to such bit errors than others. Some codecs, such as CVSD (Continuously Variable Slope Delta Modulation), were designed with bit error resiliency in mind, while others, such as A-law or u-law pulse code modulation (PCM), are extremely sensitive to even a single bit error. Model-based codecs such as the CELP (Code Excited Linear Prediction) family of audio coders may have some very sensitive bits (e.g., gain, pitch bits) and some more resilient bits (e.g., excitation).

Today, many wireless audio communications systems and devices are being deployed that operate in accordance with Bluetooth®, an industrial specification for wireless personal area networks (PANs). Bluetooth® provides a protocol for connecting and exchanging information between devices such as mobile phones, laptops, personal computers, printers, and headsets over a secure, globally unlicensed short-range radio frequency.

The original Bluetooth® audio transport mechanism is termed the Synchronous Connection-Oriented (SCO) channel, which supplies full-duplex data with a 64 kbit/s rate in each direction. There are three codecs defined for SCO channels: A-law PCM, u-law PCM, and CVSD. In practice, CVSD is used almost exclusively due to its robustness to random bit errors. With CVSD, the audio output quality degrades gracefully as the occurrence of random bit errors increases. However, CVSD is not robust to bursty bit errors, and as a result, annoying "click-like" artifacts may become audible in the audio output when bursty bit errors occur. With other codecs such as PCM or CELP-based codecs, audible clicks may be produced by even a few random bit-errors.

In a wireless communications system such as a Bluetooth® system, bit errors may become bursty under certain interference or low signal-to-noise ratio (SNR) conditions. Low SNR conditions may occur when a transmitter and receiver are at a distance from each other. Low SNR conditions might also occur when an object (such as a body part, desk or wall) impedes the direct path between a transmitter and receiver. Because a Bluetooth® radio operates on the globally available unlicensed 2.4 GHz band, it must share the band with other consumer electronic devices that also might operate in this band including but not limited to WiFi® devices, cordless phones and microwave ovens. Interference from these devices can also cause bit errors in the Bluetooth® transmission.

Bluetooth® defines four packet types for transmitting SCO data—namely, HV1, HV2, HV3, and DV packets. HV1 packets provide ⅓ rate FEC on a data payload size of 10 bytes. HV2 packets provide ⅔ rate FEC on a data payload size of 20 bytes. HV3 packets provide no FEC on a data payload of 30 bytes. DV packets provide no FEC on a data payload of 10 bytes. There is no cyclic redundancy check (CRC) protection on the SCO data in any of the HV and DV packet types. HV1 packets, while producing better error recovery than other types, accomplish this by consuming the entire bandwidth of a Bluetooth® connection. HV3 packets supply no error protection, but consume only two of every six time slots. Thus, the remaining time slots can be used to establish other connections while maintaining a SCO connection. This is not possible when using HV1 packets for transmitting SCO data. Due to this and other concerns such as power consumption, HV3 packets are most commonly used for transmitting SCO data.

A Bluetooth® packet contains an access code, a header, and a payload. While a ⅓ FEC code and an error-checking code protect the header, low signal strength or local interference may result in a packet being received with an invalid header. In this case, certain conventional Bluetooth® receivers will discard the entire packet and employ some form of PLC to conceal the effects of the lost data. However, with HV3 packets, because only the header is protected, bit errors impacting only the payload of the packet will go undetected and the corrupted data will be passed to the decoder for decoding and playback. As mentioned above, CVSD was designed to be robust to random bit-errors but is not robust to bursty bit-errors. As a result, annoying "click-like" artifacts may become audible in the audio output when bursty bit-errors occur.

Recent versions of the Bluetooth specification (in particular, version 1.2 of the Bluetooth® Core Specification and all subsequent versions thereof) include the option for Extended SCO (eSCO) channels. In theory, eSCO channels eliminate the problem of undetected bit errors in the payload of a packet by providing CRC protection for the payload and by supporting the retransmission of lost packets. However, in practice, it is not that simple. End-to-end delay is a critical component of any two-way audio communications system and this limits the number of retransmissions in eSCO channels to one or two retransmissions. Retransmissions also increase power consumption and will reduce the battery life of a Bluetooth® device. Due to this practical limit on the number of retransmissions, bit errors may still be present in the payload of the received packet. One approach to this issue is to simply declare a packet loss when a CRC check applied to the payload fails and employ PLC. However, in most cases, there may only be a few random bit errors present in the payload, in which case, better quality may have been obtained by allowing the data to be decoded by the decoder as opposed to discarding the whole packet of data and concealing with PLC. Consequently, the case of bit-error-induced artifacts is still a problem for eSCO channels.

BRIEF SUMMARY OF THE INVENTION

The present invention provides systems and methods for concealing bit errors present in an encoded bit stream representative of a portion of an audio signal, wherein the encoded bit stream is received via a link in an audio communications system. The link may comprise, for example, a wireless link in a Bluetooth® audio communications system that supports a Synchronous Connection-Oriented (SCO) channel or an Extended SCO (eSCO) channel, although the invention is not so limited.

In particular, a method for performing bit error concealment is described herein. In accordance with the method, a portion of a modulated carrier signal received over a communication link is demodulated to produce a series of encoded bits representative of a portion of an audio signal. A number of bit errors present in the series of encoded bits is estimated based on at least one characteristic of the portion of the modulated carrier signal. One of a plurality of methods for producing a series of digital audio samples representative of the portion of the audio signal is then performed based on at least the estimated number of bit errors. The series of digital audio samples produced by the selected method are then converted into a form suitable for playback to a user.

In one embodiment of the foregoing method, the portion of the modulated carrier signal is modulated in accordance with a constant-envelope modulation technique and the step of estimating the number of bit errors present in the series of encoded bits based on at least one characteristic of the portion of the modulated carrier signal includes calculating an estimated variance of a magnitude associated with each of a plurality of symbols in the portion of the modulated carrier signal and estimating the number of bit errors based on the estimated variance.

In an alternate embodiment of the foregoing method, the portion of the modulated carrier signal is modulated in accordance with a phase shift keying modulation technique and the step of estimating the number of bit errors present in the series of encoded bits based on at least one characteristic of the portion of the modulated carrier signal includes calculating an estimated variance of a phase error associated with each of a plurality of symbols in the portion of the modulated carrier signal and estimating the number of bit errors based on the estimated variance.

In a further embodiment of the foregoing method, the step of selectively performing one of a plurality of methods for producing a series of digital audio samples representative of the portion of the audio signal based on at least the estimated number of bit errors includes selectively performing one of: obtaining samples generated by an audio decoder based on the decoding of the encoded bit stream for use as the series of digital audio samples; or performing a packet loss concealment algorithm to produce the series of digital audio samples.

A system is also described herein. The system includes a demodulator, a data generator, bit error concealment logic, selection logic and a digital-to-analog converter. The demodulator is configured to demodulate a portion of a modulated carrier signal received over a communication link to produce a series of encoded bits representative of a portion of an audio signal. The data generator is configured to determine at least one characteristic of the portion of the modulated character signal. The bit error concealment logic is configured to estimate a number of bit errors present in the series of encoded bits based on the at least one characteristic of the portion of the modulated carrier signal and to produce an indicator based on the estimated number of bit errors. The selection logic is configured to select one of a plurality of means for producing a series of digital audio samples representative of the portion of the audio signal based on at least the indicator. The digital-to-analog converter is configured to convert the series of digital audio samples produced by the selected means into an analog audio signal suitable for playback to a user.

An alternative method for performing bit error concealment is also described herein. In accordance with the method, a portion of a modulated carrier signal received over a communication link is demodulated to produce a series of encoded bits representative of a portion of an audio signal. A number, location and/or distribution of bit errors present in the series of encoded bits is estimated based on at least one characteristic of the portion of the modulated carrier signal. One of a plurality of methods for producing a series of digital audio samples representative of the portion of the audio signal is then performed based on at least the estimated number, location and/or distribution of bit errors. The series of digital audio samples produced by the selected method is then converted into a form suitable for playback to a user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
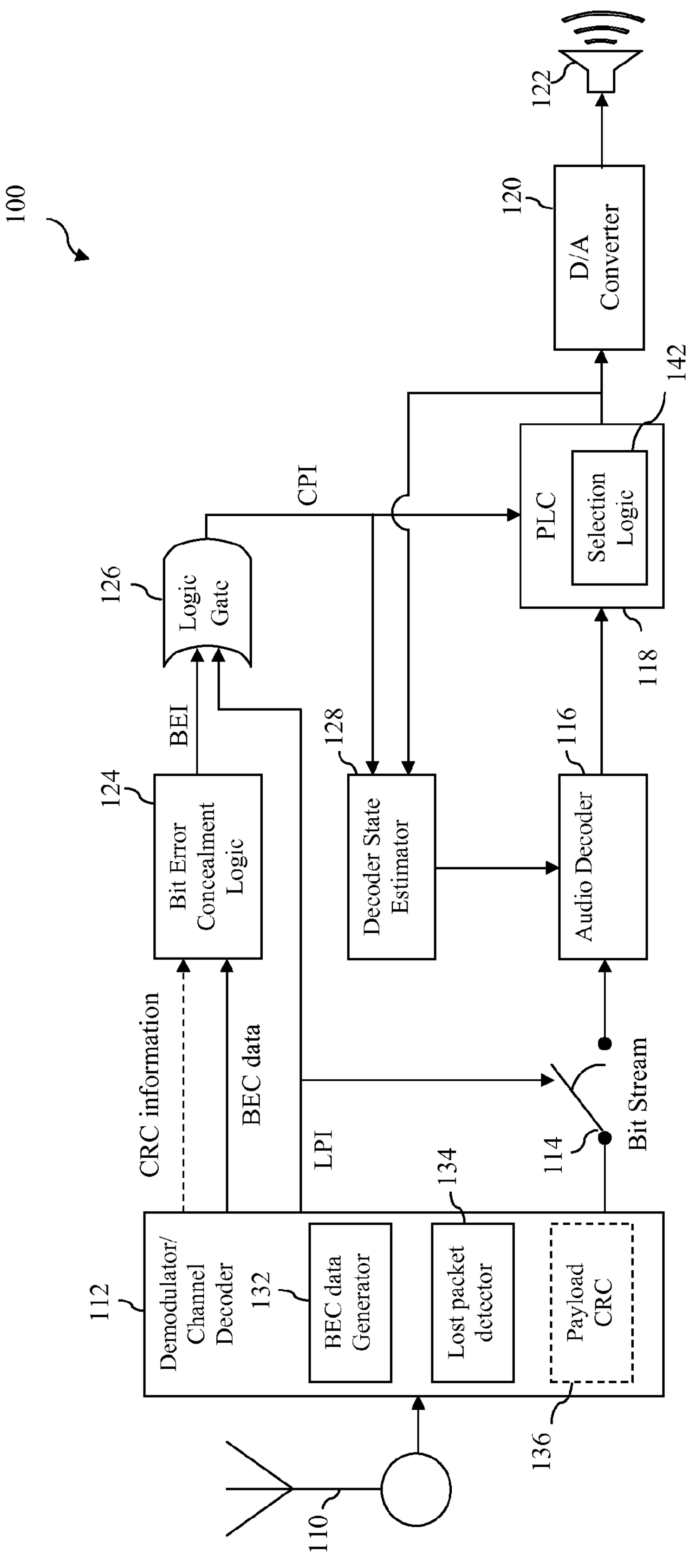
FIG. 1 is a block diagram of a system that performs bit error concealment in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

The following Sections generally describe improved systems and methods for managing bit errors present in a series of encoded bits representative of a portion of an audio signal, wherein the series of encoded bits is received over a communication link in an audio communications system. In certain systems and methods described herein, at least one characteristic of a portion of a received modulated carrier signal that is demodulated to produce the series of encoded bits is determined. A number of bit errors present in the series of encoded bits is then determined based on the characteristic(s). Based on the estimated number of bit errors, one of a plurality of methods for producing a series of digital audio samples representative of the portion of the audio signal is selectively performed. These methods may include, for example, obtaining digital audio samples produced by normal audio decoding of the encoded bit stream or performing packet loss concealment to produced synthesized digital audio samples. The method that is selected is intended to produce the best output audio quality given the estimated number of bit errors. The series of digital audio samples produced by the selected method is then converted into a form suitable for playback to a user.

B. Example Bit Error Concealment System

FIG. 1 is a block diagram of an example system 100 that performs bit error concealment in accordance with an embodiment of the present invention. System 100 is intended to represent elements of a receiver in a wireless audio communications system. For example, the elements of system 100 may comprise elements of a receiver in a Bluetooth® communications system. However, as will be appreciated by persons skilled in the relevant art(s) based on the teachings provided herein, an embodiment of the present invention may also be implemented in various other audio communications systems. Thus, the present invention is not limited to implementation in a Bluetooth® communications system.

As shown in FIG. 1, system 100 includes an antenna 110, a demodulator/channel decoder 112, switching logic 114, an audio decoder 116, a packet loss concealment (PLC) block 118, a digital-to-analog (D/A) converter 120, a speaker 122, bit error concealment (BEC) logic 124, a logic gate 126 and a decoder state estimator 128. Each of these elements will now be described.

Antenna 110 operates in a well-known manner to receive a modulated carrier signal over a wireless communication link. In an embodiment in which system 100 is implemented in a Bluetooth® receiver, the modulated carrier signal is located in the 2.4 GHz spread-spectrum band utilized by Bluetooth® communications systems.

Demodulator/channel decoder 112 is configured to demodulate a portion of the modulated carrier signal to produce a packet that includes a series of encoded bits representative of a portion of an audio signal. In an embodiment in which system 100 is implemented in a Bluetooth® receiver, demodulator/channel decoder 112 demodulates a portion of the modulated carrier signal to produce a Bluetooth® packet, wherein a payload of the Bluetooth® packet includes the series of encoded bits that represent the portion of the audio signal.

As will be appreciated by persons skilled in the relevant art(s), the type(s) of demodulation performed by demodulator/channel decoder 112 to produce the packet will correspond to the type(s) of modulation used by a transmitter to modulate the packet onto the carrier signal. For example, when a Bluetooth® basic rate packet is being transmitted across the wireless link, the entire packet is modulated onto the carrier signal using a Gaussian frequency shift keying (GFSK) technique. In this case, demodulator/channel decoder 112 will perform GFSK demodulation to recover the packet. However, when a Bluetooth® enhanced data rate (EDR) packet is being transmitted across the wireless link, an access code and header of the packet will be modulated onto the carrier signal using a GFSK modulation technique while the remainder of the packet, including the payload, will be modulated onto the carrier signal using one of two different differential phase shift keying (DPSK) techniques: differential quaternary phase shift keying (DQPSK) or eight-ary differential phase shift keying (D8PSK). In this case, demodulator/channel decoder 112 will perform GFSK demodulation to recover the access code and header portions of the packet and either DQPSK or D8PSK demodulation to recover the remainder of the packet, including the payload. The Bluetooth® basic rate and EDR packet types and the modulation/demodulation techniques used for transmission of each are described in the Bluetooth® Core Specification (a current version of which is entitled BLUETOOTH SPECIFICATION Version 2.1 +EDR, Jul. 26, 2007), the entirety of which is incorporated by reference herein.

As further shown in FIG. 1, demodulator/channel decoder 112 includes a bit error concealment (BEC) data generator 132. BEC data generator 132 is configured to generate data relating to at least one characteristic of the portion of the modulated carrier signal and to provide such data (denoted "BEC data" in FIG. 1) to BEC logic 124. BEC logic 124 is configured to use this data to estimate a number of bit errors present in the series of encoded bits representative of the portion of the audio signal. BEC logic 124 is further configured to use the estimated number of bit errors to determine whether or not bit errors sufficient to cause an audible artifact have impacted the series of encoded bits. If BEC logic 124 determines that bit errors sufficient to cause an audible artifact have impacted the series of encoded bits, then BEC logic 124 asserts a bit error indicator (BEI) signal, which is received by logic gate 126. Otherwise, the BEI signal is negated.

As also shown in FIG. 1, demodulator/channel decoder 112 includes a lost packet detector 134. Lost packet detector 134 is configured to apply error detection and/or error correction techniques to the packet produced by demodulator/channel decoder 112 to determine whether or not the series of encoded bits included therein is suitable for audio decoding. In an embodiment in which system 100 is implemented in a Bluetooth® receiver, the application of these techniques may include, for example and without limitation, determining if more than a predefined number of bits of a sync word portion of a Bluetooth® packet are in error, analyzing header error check (HEC) bits in a header of the Bluetooth® packet to determine if the header has been corrupted, and/or analyzing FEC information included in the header of the Bluetooth® packet to detect and correct errors in the packet header. If lost packet detector 132 determines that the packet is not suitable for audio decoding, the packet is deemed lost and lost packet detector 132 asserts a lost packet indicator (LPI) signal, which is received by switching logic 114 and logic gate 126. Otherwise, the packet is deemed received and the LPI signal is negated.

Note that if the packet is a Bluetooth® HV1 or HV2 packet, lost packet detector 134 may also analyze FEC information associated with the packet payload in determining whether or not the packet is deemed lost. For Bluetooth® HV3 and DV packets, no such FEC information is available. Furthermore, Bluetooth® HV1, HV2, HV3 and DV packets do not include any CRC information associated with the packet payload. Consequently, lost packet detector 134 may not consider such CRC information in determining whether these packet types are deemed lost.

If system 100 is implemented in a Bluetooth® receiver that supports extended Synchronous Connection-Oriented (eSCO) channels, then the packet may comprise a Bluetooth® EV3, EV4 or EV5 packet, each of which includes CRC information associated with the packet payload. In such an embodiment, lost packet detector 134 may be configured to analyze this CRC information in determining whether or not the packet is deemed lost. Alternatively or additionally, as shown in FIG. 1, a payload CRC 136 may optionally be included within demodulator/channel decoder 112 to analyze the CRC information associated with the packet payload and provide information generated based on the analysis (denoted "CRC information") to BEC logic 124. This information may indicate, for example, whether or not the payload of the packet has passed a CRC check. BEC logic 124 may use this information in determining whether or not bit errors sufficient to cause an audible artifact have occurred. For example, in one embodiment, if the CRC information generated by payload CRC 136 indicates that the packet payload has passed a CRC check, then BEC logic 124 will determine that bit errors sufficient to cause an audible artifact have not occurred.

Logic gate 126 is configured to receive the BEI signal from BEC logic 124 as well as the LPI signal from lost packet detector 134 and to selectively assert or negate a corrupted packet indicator (CPI) signal based on the state of the BEI and LPI signals. In particular, logic gate 126 will assert the CPI signal if either or both of the BEI and LPI signals are asserted and will negate the CPI signal if both of the BEI and LPI signals are negated. Assertion of the CPI signal by logic gate 126 indicates that the packet has been deemed corrupted. The CPI signal generated by logic gate 126 is received by PLC block 118 and is used in a manner that will be described in more detail below.

If the LPI signal generated by lost packet detector 134 is asserted, then switching logic 114 prevents the series of encoded bits included within the packet from being provided to audio decoder 116. In certain implementations, the operation of audio decoder 116 may be halted when this occurs. However, if the LPI signal is negated, then switching logic 114 passes the series of encoded bits to audio decoder 116. Although switching logic 114 is depicted as an actual switch in FIG. 1, person(s) skilled in the relevant art(s) will appreciate that such logic may be implemented using a wide variety of software and/or hardware elements.

Audio decoder 116 is adapted to decompress the series of encoded bits (when available) received from demodulator/channel decoder 112 in accordance with an audio decoding technique to generate a series of digital audio samples. For example, audio decoder 116 may decompress the encoded bit stream in accordance with a CVSD (Continuously Variable Slope Delta Modulation) audio decoding technique. Alternatively, audio decoder 116 may apply an A-law or μ-law Pulse Code Modulation (PCM) audio decoding technique, or some other audio decoding technique. In an embodiment, the decoded digital audio samples produced by audio decoder 116 comprise a frame of PCM samples. The output of audio decoder 116 is passed to PLC block 118.

As shown in FIG. 1, PLC block 118 includes selection logic 142. Selection logic 142 is configured to monitor the CPI signal generated by logic gate 126 to determine whether or not the packet has been deemed corrupted. If the CPI signal indicates that the packet has been deemed corrupted, selection logic 142 will cause PLC block 118 to perform operations to synthesize a series of digital audio samples to replace the digital audio samples that were produced by audio decoder 116 in the case where the packet has not been deemed lost (i.e., LPI is not asserted) or to replace the digital audio samples that would have been produced by audio decoder 116 in the case where the packet has been deemed lost (i.e., LPI is asserted) and to pass the synthesized digital audio samples to D/A converter 120. A variety of PLC techniques are known in the art for generating the synthesized digital audio samples. Many of these techniques use some form of time or frequency extrapolation of the decoded audio waveform(s) preceding the waveform represented by a lost packet to generate replacement samples.

However, if the CPI signal indicates that the packet has not been deemed corrupted, selection logic 142 will cause PLC block 118 to pass the decoded digital audio samples produced by audio decoder 116 to D/A converter 120.

D/A converter 120 is adapted to convert the digital audio samples received from PLC block 118 into an analog audio signal. A speaker 122 comprising an electromechanical transducer is connected to D/A converter 120 and operates in a well-known manner to convert the analog audio signal into sound waves for perception by a user.

As further shown in FIG. 1, system 100 also includes decoder state estimator 128. Decoder state estimator 128 is configured to monitor the CPI signal generated by logic gate 126 to determine whether or not the packet has been deemed corrupted. If the packet has been deemed corrupted, then decoder state estimator 128 will perform operations to estimate what the value of certain state information maintained by audio decoder 116 should be and to update this state information accordingly. This decoder state estimation technique is intended to maintain a certain level of synchronization between audio decoder 116 and an audio encoder on the transmit side of the wireless communication link even when a packet has been deemed lost or corrupted. As will be appreciated by persons skilled in the relevant art(s), the type of state information maintained by audio decoder 116 will vary depending on the type of audio encoding/decoding used by system 100.

In an embodiment in which audio decoder 116 comprises a CVSD decoder, decoder state estimator 128 may operate to re-encode the synthesized digital audio samples produced by PLC logic 118 when a packet is deemed corrupted, thereby generating estimated decoder state information. Decoder state estimator 128 will then overwrite the state information maintained by audio decoder 116 with the estimated decoder state information. However, this is only one example of a technique by which the state of audio decoder 116 may be estimated and updated and other techniques may be used.

As will be appreciated by persons skilled in the relevant art(s), each of demodulator/channel decoder 112, switching logic 114, audio decoder 116, PLC block 118, BEC logic 124, logic gate 126 and decoder state estimator 128 as described above in reference to FIG. 1 may be implemented in hardware using analog and/or digital circuits, in software, through the execution of instructions by one or more general purpose or special-purpose processors, or as a combination of hardware and software.

As can be seen from the foregoing description of system 100, by monitoring the CPI signal, selection logic 142 within PLC block 118 can select the method for generating digital audio samples that will produce the best output audio quality. Since the CPI signal is asserted whenever the LPI signal is asserted, this means that selection logic 142 will cause PLC to be performed in every case in which lost packet detector 134 within demodulator/channel decoder 112 determines that a packet has been lost. This is consistent with the performance of conventional systems that perform packet loss concealment, for example, when it is determined that the header of a packet is corrupted.

However, because the CPI signal is also asserted whenever the BEI signal is asserted, PLC will also be performed when BEC logic 124 determines that bit errors sufficient to cause an audible artifact have impacted the packet payload. Thus, for example, even in a situation in which lost packet detector 134 has deemed that a packet is not lost, BEC logic 124 may nevertheless determine that bit errors sufficient to cause an audible artifact have impacted the packet payload such that PLC should be performed. This approach is particularly useful in an embodiment in which lost packet detector 134 is not capable of assessing the state of the packet payload (e.g., in an embodiment in which system 100 is implemented in a Bluetooth® receiver and the received packet is an HV3 packet having no payload FEC or CRC). Additionally, since BEC logic 124 will assert the BEI signal only when the estimated number of bit errors suggests that bit errors sufficient to cause an audible artifact have impacted the packet payload, selection logic 142 will select the output of audio decoder 116 instead of performing PLC in instances where the packet has not been deemed lost and the estimated number of bit errors suggests that no audible artifacts will occur.

1. Example Implementations of BEC Data Generator

As discussed above in reference to system 100 of FIG. 1, BEC data generator 132 is configured to generate data relating to at least one characteristic of a portion of a modulated carrier signal received by demodulator/channel decoder 112 and to provide such data to BEC logic 124. This data is then used by BEC logic 124 to estimate a number of bit errors present in a series of encoded bits obtained by demodulating the portion of the modulated carrier signal. Various implementations of BEC data generator 132 will now be described. These implementations are described herein by way of example only and are not intended to limit the present invention.

Figure 2:
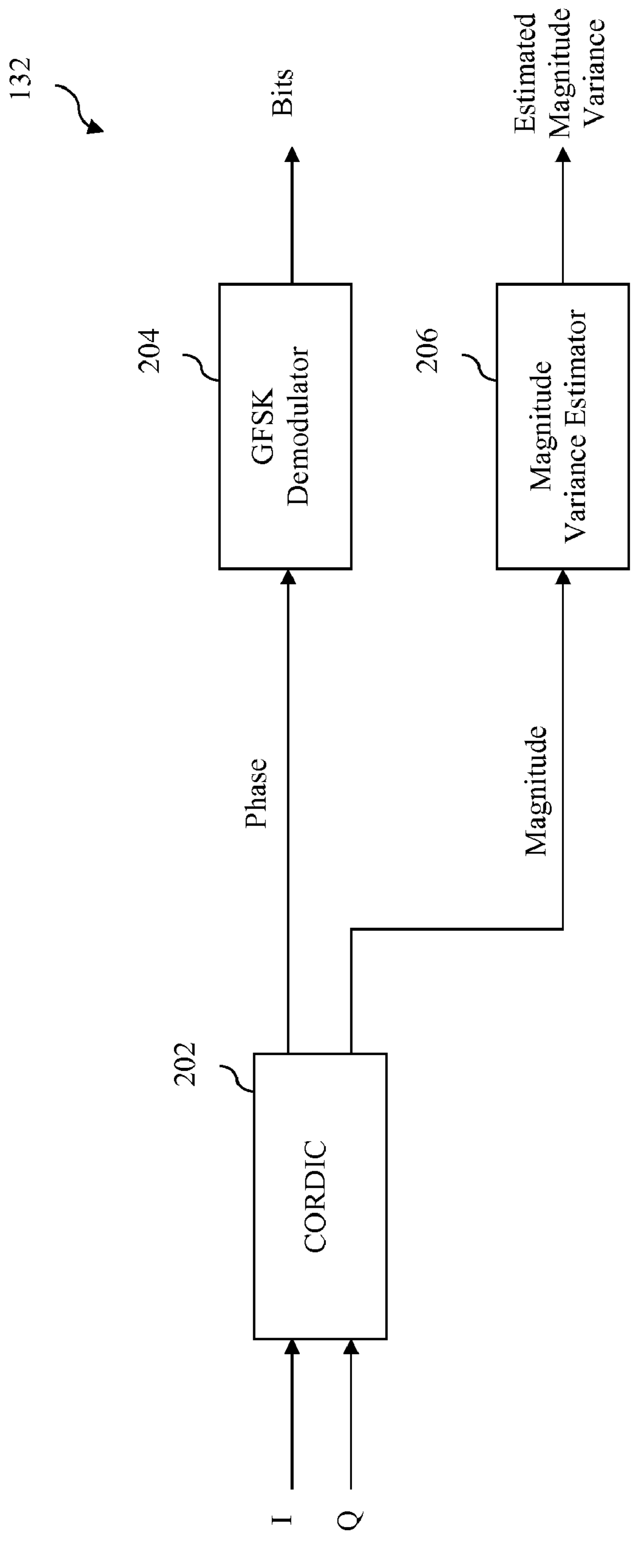
FIG. 2 is a block diagram of a bit error concealment (BEC) data generator in accordance with an embodiment of the present invention.

FIG. 2 is a block diagram of an implementation of BEC data generator 132 in accordance with one embodiment of the present invention. The implementation of BEC data generator 132 shown in FIG. 2 calculates an estimated variance of a magnitude associated with each of a plurality of symbols in a portion of a GFSK-modulated carrier signal demodulated by demodulator/channel decoder 112. This estimated magnitude variance is then provided to BEC logic 124, which uses the estimated magnitude variance to estimate a number of bit errors present in a series of encoded bits obtained through the demodulation of the portion of the GFSK-modulated carrier signal.

In particular, the implementation of BEC data generator 132 shown in FIG. 2 includes a coordinate rotation digital computer (CORDIC) 202, a GFSK demodulator 204 and a magnitude variance estimator 206. CORDIC 202 is configured to receive in-phase (I) and quadrature-phase (Q) components of a portion of a GFSK-modulated carrier signal and to calculate a phase and magnitude associated with each of a plurality of symbols in the portion of the GFSK-modulated carrier signal based thereon. The phase associated with each symbol is provided to GFSK demodulator 204, which processes such information in a well-known manner to produce one or more bits corresponding to each symbol. The series of bits output by GFSK demodulator 204 based on the processing of the phase associated with each symbol includes a series of encoded bits representative of a portion of an audio signal.

As further shown in FIG. 2, the magnitude associated with each symbol in the portion of the GFSK-modulated carrier signal is provided to magnitude variance estimator 206, which calculates an estimated magnitude variance based thereon. This estimated magnitude variance is then provided to BEC logic 124, which uses such information to estimate a number of bit errors in the series of encoded bits representative of the portion of the audio signal. In certain implementations, the magnitude information produced by CORDIC 202 may also be used to calculate a received signal strength associated with the modulated carrier signal, or to perform other functions.

Figure 3:
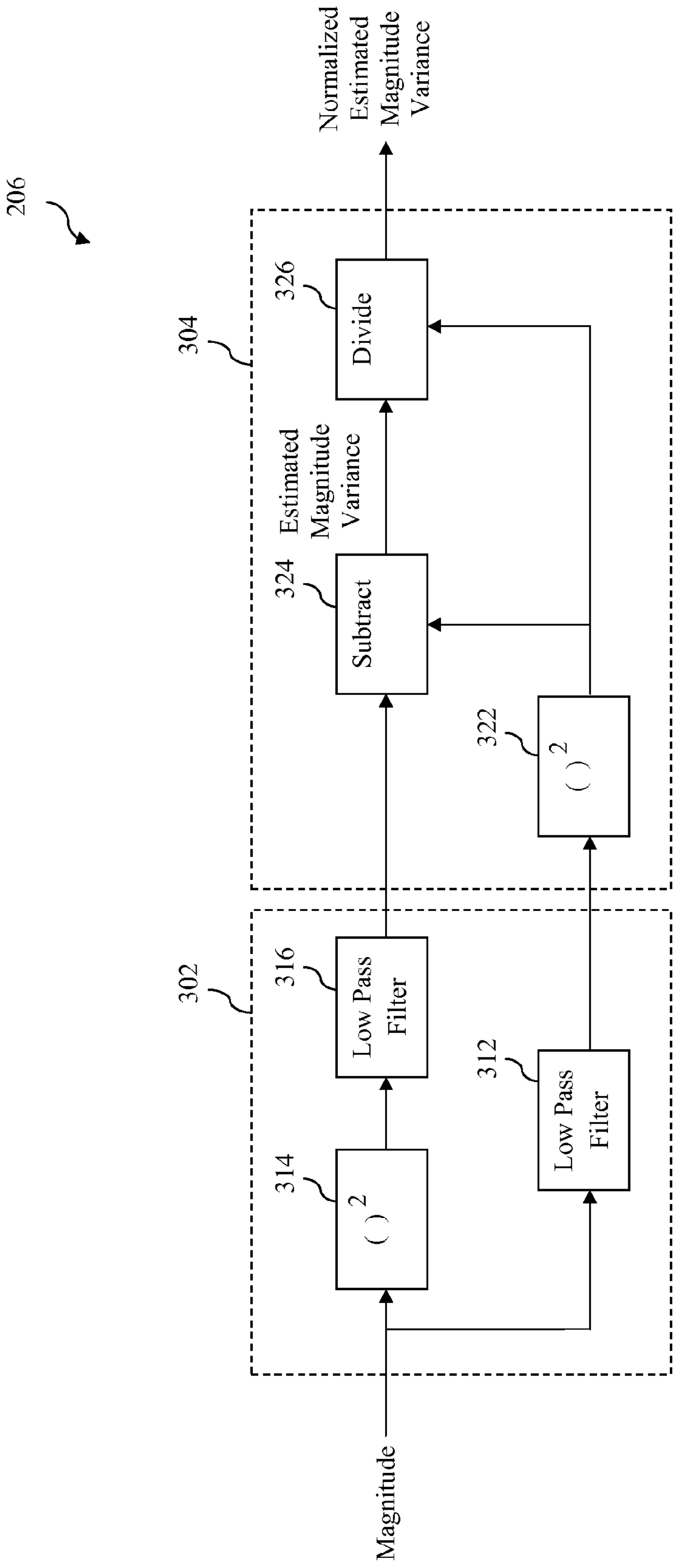
FIG. 3 is a block diagram of a magnitude variance estimator that calculates an estimated variance of a magnitude associated with each of a plurality of symbols in a portion of a modulated carrier signal in accordance with an embodiment of the present invention.

Magnitude variance estimator 206 may use various approaches for calculating the estimated magnitude variance. FIG. 3 is a block diagram of one implementation of magnitude variance estimator 206 that produces an estimated magnitude variance for a portion of a modulated carrier signal.

In the implementation shown in FIG. 3, the elements encompassed by dashed line 302 comprise elements that perform calculations each time a magnitude associated with a symbol in the portion of the modulated carrier signal is received. These elements include a first low pass filter 312, a first logic block 314, and a second low pass filter 316. First low pass filter 312 receives a magnitude associated with each symbol in the portion of the demodulated carrier signal and uses this value to update a running average of the magnitude of the symbols. First logic block 314 receives the magnitude associated with each symbol in the portion of the demodulated carrier signal and squares the magnitude. Second low pass filter 316 receives the output of first logic block 314 and uses this value to update a running average of the square of the magnitude of the symbols.

In the implementation shown in FIG. 3, the elements encompassed by dashed line 304 comprise elements that perform calculations only after the magnitudes associated with all the symbols in the portion of the modulated carrier signal have been received and processed by the elements encompassed by dashed line 302. The elements encompassed by dashed line 304 include a second logic block 322, a subtraction block 324 and a division block 326. Second logic block 322 receives the average of the magnitude of the symbols calculated by first low pass filter 312 and squares the value to produce a square of the average of the magnitude of the symbols. Subtraction block 324 subtracts the square of the average of the magnitude of the symbols produced by second logic block 322 from the average of the square of the magnitude of the symbols produced by second low pass filter 316 to produce an estimated magnitude variance. Division block 326 divides the estimated magnitude variance by the square of the average of the magnitude of the symbols produced by second logic block 322 to produce a normalized estimated magnitude variance. Such normalization may be performed in order to account for changes in gain applied to the portion of the modulated carrier signal by an automatic gain control (AGC).

As will be appreciated by persons skilled in the relevant art(s), if a random variable X has an expected value (mean) $\mu=E(X)$, then the variance Var(X) of X is given by $$\mathrm{Var}(X)=E[(X-\mu)^2]$$

which may be expanded to $$\mathrm{Var}(X)=E(X^2)-\mu^2.$$

In the foregoing implementation shown in FIG. 3, first logic block 314 may be thought of as calculating $X^2$ where X is the magnitude associated with each symbol in the portion of the modulated carrier signal, second low pass filter 316 may be thought of as calculating $E(X^2)$, second logic block 322 may be thought of as calculating $\mu^2$ and subtraction block 324 may be thought of as calculating $E(X^2)-\mu^2$.

The foregoing implementation of FIG. 3 calculates an estimated magnitude variance on the fly as magnitudes are received from CORDIC 202. In an alternate implementation, a magnitude variance may be calculated by storing each magnitude produced by CORDIC 202 in association with a symbol in the portion of the modulated carrier signal in a buffer and then accessing all of the magnitudes to perform a standard variance calculation. In contrast to such an approach, the foregoing approach described in reference to FIG. 3 provides the advantage of simplicity and minimal storage requirements, as the only memory required is the filter memory that stores the running average of the magnitudes and the square of the magnitudes.

Figure 4:
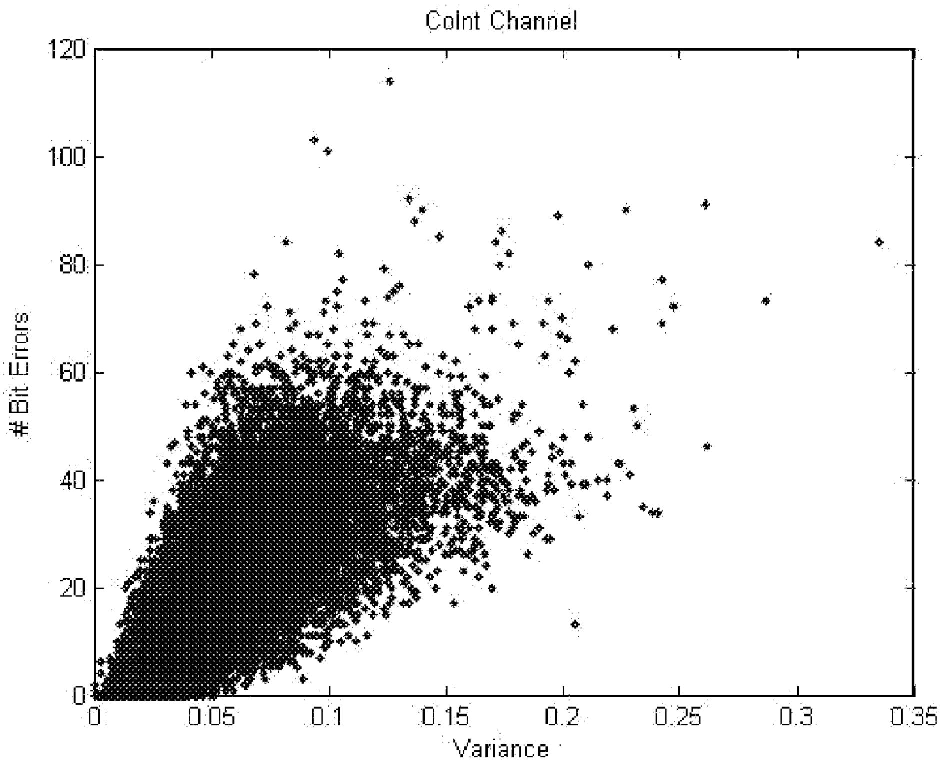
FIG. 4 is a scatter plot that depicts a relationship between an estimated magnitude variance associated with portions of a carrier signal modulated in accordance with a Gaussian frequency shift keying (GFSK) technique and a number of bit errors associated with corresponding demodulated portions of the signal.

The implementation of BEC data generator 132 described above in reference to FIG. 2 and FIG. 3 is useful when a constant-envelope modulation technique, such as GFSK, is used to modulate packets onto the carrier signal received by system 100. With constant-envelope modulation, if the modulated carrier signal is transmitted without corruption, then the magnitude of the symbols received at the demodulator should display little or no variance. Conversely, if the magnitude of the received symbols displays substantial variance, then it may be safe to assume that the quality of the channel is degraded and that bit errors have occurred. In fact, it has been observed that a strong correlation exists between the estimated magnitude variance of the received symbols of a constant-envelope modulated carrier signal and the number of bit errors present in the demodulated version of the signal. This is illustrated in FIG. 4, which is a scatter plot 400 showing the estimated magnitude variance associated with various portions of a GFSK-modulated carrier signal and the number of bit errors associated with the corresponding demodulated portions of the signal. As shown in FIG. 4, in general, the number of bit errors increases as the estimated magnitude variance increases.

However, if a modulation technique that is not a constant-envelope modulation technique is used to modulate packets onto the carrier signal received by system 100, then calculating an estimated magnitude variance will not be useful in estimating the number of bit errors. In this case, if the modulation technique is a phase shift keying modulation technique such as DPSK, then BEC data generator 132 may be configured to calculate an estimated variance of a phase error associated with each of the symbols in a portion of the modulated carrier signal and the estimated phase error variance may be used to estimate the number of bit errors.

Figure 5:
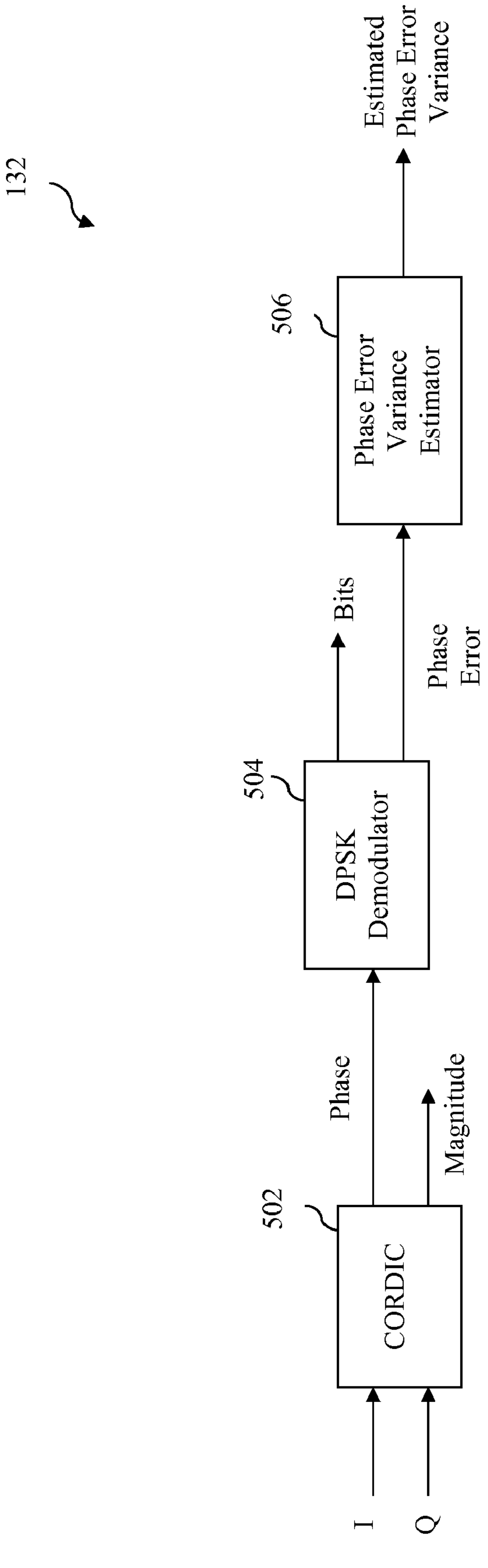
FIG. 5 is a block diagram of a BEC data generator in accordance with an alternate embodiment of the present invention.

FIG. 5 is a block diagram of an implementation of BEC data generator 132 in accordance with such an embodiment. In particular, the implementation of BEC data generator 132 shown in FIG. 5 calculates an estimated variance of a phase error associated with each of the symbols in a portion of a DPSK-modulated carrier signal. The estimated phase error variance is then provided to BEC logic 124, which uses the estimated phase error variance to estimate a number of bit errors present in a series of encoded bits obtained through the demodulation of the portion of the DPSK-modulated carrier signal.

The implementation of BEC data generator 132 shown in FIG. 5 includes a CORDIC 502, a DPSK demodulator 504 and a phase error variance estimator 506. CORDIC 502 is configured to receive I and Q components of a portion of a DPSK-modulated carrier signal and to calculate a phase and magnitude associated with each of a plurality of symbols in the portion of the DPSK-modulated carrier signal based thereon. The phase associated with each symbol is provided to DPSK demodulator 504, which processes such information in a well-known manner to produce one or more bits corresponding to each symbol. The series of bits output by DPSK demodulator 504 based on the processing of the phase associated with each symbol includes a series of encoded bits representative of a portion of an audio signal. The magnitude information produced by CORDIC 502 may be used to calculate a received signal strength associated with the modulated carrier signal or to perform other functions.

As further shown in FIG. 5, DPSK demodulator 504 produces a phase error for each symbol in the portion of the DPSK-modulated carrier signal. The phase error represents the distance between the received symbol and a closest point in the constellation of the DPSK modulation scheme, which is the point to which the received symbol is mapped for the purpose of generating bits. The phase error for each symbol is provided to phase error variance estimator 506, which calculates an estimated phase error variance based thereon. This estimated phase error variance is then provided to BEC logic 124, which uses such information to estimate a number of bit errors in the series of encoded bits representative of the portion of the audio signal.

Figure 6:
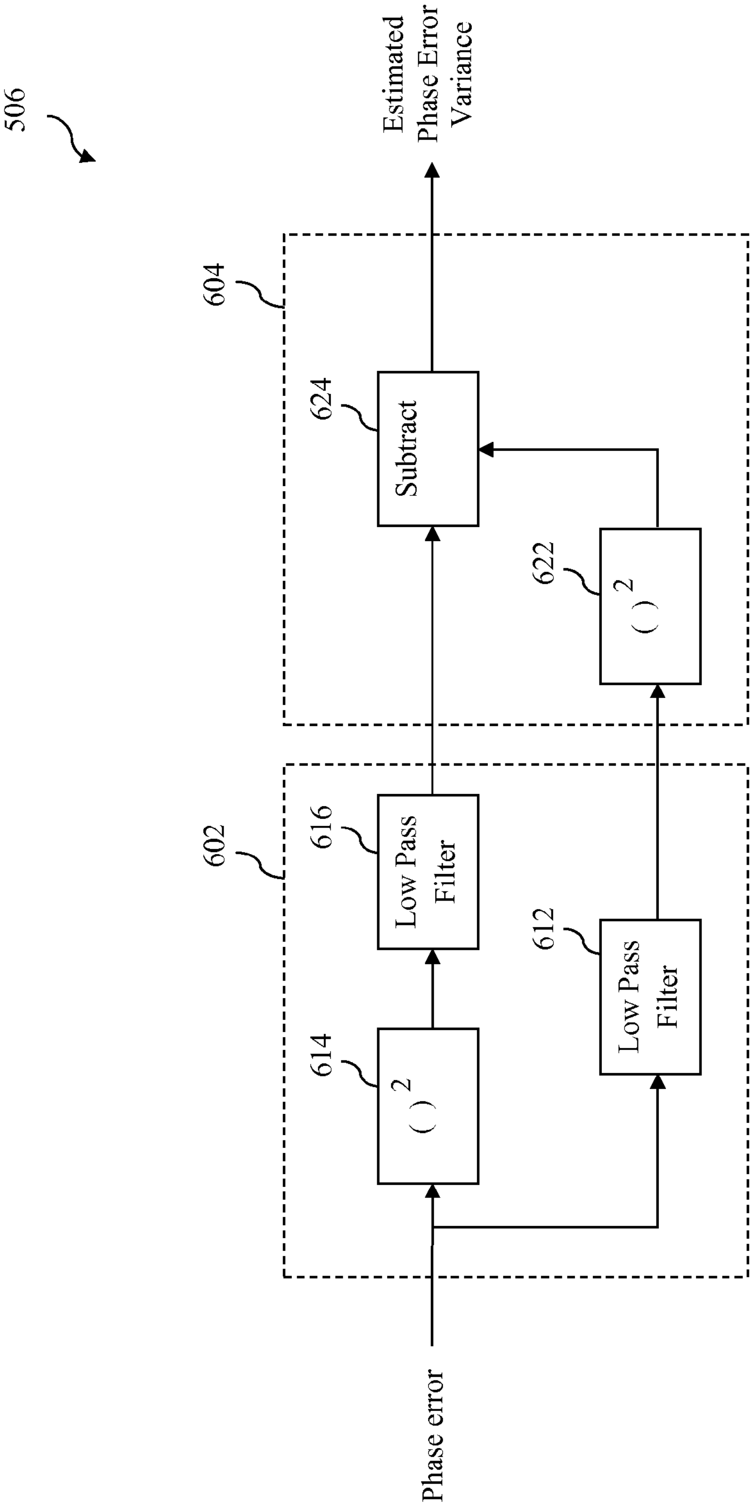
FIG. 6 is a block diagram of a phase error variance estimator that calculates an estimated variance of a phase error associated with each of a plurality of symbols in a portion of a modulated carrier signal in accordance with an embodiment of the present invention.

Phase error variance estimator 506 may use various approaches for calculating the estimated phase error variance. FIG. 6 is a block diagram of one implementation of phase error variance estimator 506 that produces an estimated phase error variance for a portion of a modulated carrier signal.

In the implementation shown in FIG. 6, the elements encompassed by dashed line 602 comprise elements that perform calculations each time a phase error associated with a symbol in the portion of the modulated carrier signal is received. These elements include a first low pass filter 612, a first logic block 614, and a second low pass filter 616. First low pass filter 612 receives a phase error associated with each symbol in the portion of the demodulated carrier signal and uses this value to update a running average of the phase error of the symbols. First logic block 614 receives the phase error associated with each symbol in the portion of the demodulated carrier signal and squares the phase error. Second low pass filter 616 receives the output of first logic block 614 and uses this value to update a running average of the square of the phase error of the symbols.

In the implementation shown in FIG. 6, the elements encompassed by dashed line 604 comprise elements that perform calculations only after the phase errors associated with all the symbols in the portion of the modulated carrier signal have been received and processed by the elements encompassed by dashed line 602. The elements encompassed by dashed line 604 include a second logic block 622 and a subtraction block 624. Second logic block 622 receives the average of the phase error of the symbols calculated by first low pass filter 612 and squares the value to produce a square of the average of the phase error of the symbols. Subtraction block 624 subtracts the square of the average of the phase error of the symbols produced by second logic block 622 from the average of the square of the phase error of the symbols produced by second low pass filter 616 to produce an estimated phase error variance.

As previously noted, if a random variable X has an expected value (mean) $\mu=E(X)$, then the variance Var(X) of X is given by $$\mathrm{Var}(X)=E[(X-\mu)^2]$$

which may be expanded to $$\mathrm{Var}(X)=E(X^2)-\mu^2.$$

In the foregoing implementation shown in FIG. 6, first logic block 614 may be thought of as calculating $X^2$ where X is the phase error associated with each symbol in the portion of the modulated carrier signal, second low pass filter 616 may be thought of as calculating $E(X^2)$, second logic block 622 may be thought of as calculating $\mu^2$ and subtraction block 624 may be thought of as calculating $E(X^2)-\mu^2$.

The foregoing implementation of FIG. 3 calculates an estimated phase error variance on the fly as phase errors are received from CORDIC 502. In an alternative implementation, a phase error variance may be calculated by storing each phase error produced by DPSK demodulator 504 in association with a symbol in the portion of the modulated carrier signal in a buffer and then subsequently accessing all of the phase errors to perform a standard variance calculation. The foregoing approach described in reference to FIG. 6 provides the advantage of simplicity and minimal storage requirements, as the only memory required is the filter memory that stores the running average of the phase errors and the square of the phase errors.

Figure 7:
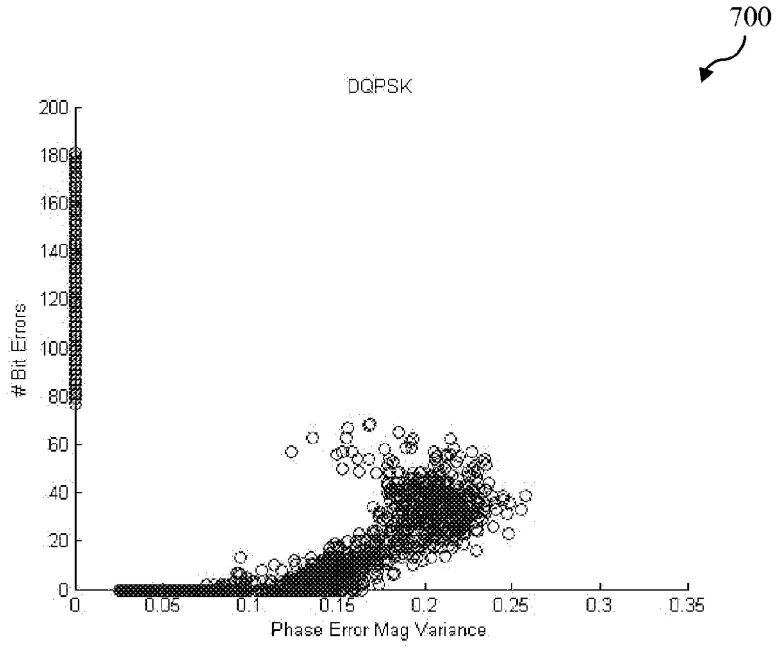
FIG. 7 is a scatter plot that depicts a relationship between an estimated magnitude variance associated with portions of a carrier signal modulated in accordance with a differential quaternary phase shift keying (DQPSK) technique and a number of bit errors associated with corresponding demodulated portions of the signal.
Figure 8:
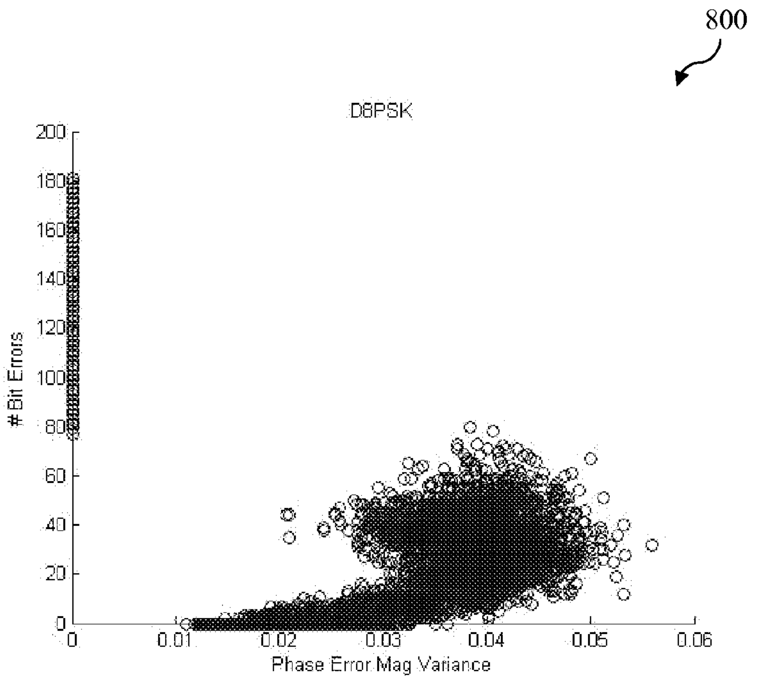
FIG. 8 is a scatter plot that depicts a relationship between an estimated magnitude variance associated with portions of a carrier signal modulated in accordance with an eight-ary differential phase shift keying (D8PSK) technique and a number of bit errors associated with corresponding demodulated portions of the signal.

The implementation of BEC data generator 132 described above in reference to FIG. 5 and FIG. 6 is useful when a phase shift keying modulation technique such as DPSK is used to modulate packets onto the carrier signal received by system 100. When utilizing such a modulation technique, if the modulated carrier signal is transmitted without corruption, then the symbols received at the demodulator will match up very well with the constellation points and the phase error associated with those symbols will display little or no variance. Conversely, if the phase error associated with the received symbols displays substantial variance, then it may be safe to assume that the quality of the channel is degraded and that bit errors have occurred. In fact, it has been observed that a strong correlation exists between the estimated phase error variance of the symbols of a DPSK modulated signal and the number of bit errors present in the demodulated version of the signal. This is illustrated both in FIG. 7, which is a scatter plot 700 showing the estimated phase error variance associated with various portions a DQPSK-modulated carrier signal and the number of bit errors associated with the corresponding demodulated portions of the signal, and FIG. 8, which is a scatter plot 800 showing the estimated phase error variance associated with various portions of a D8PSK-modulated carrier signal and the number of bit errors associated with the corresponding demodulated portions of the signal. As shown in FIGS. 7 and 8, in general, the number of bit errors increases as the estimated phase error variance increases.

Although the example implementations of BEC data generator 132 described in this section calculate an estimated magnitude variance or an estimated phase error variance associated with a portion of a modulated carrier signal, it is to be understood that BEC data generator 132 may also be configured to determine or calculate other characteristics associated with the portion of the modulated carrier signal that may be used to estimate the number, distribution or location of bit errors in the bits produced by demodulating the portion of the modulated carrier signal. Such other characteristics may include, but are not limited to, a sum of a magnitude error (as measured in reference to an expected magnitude) associated with the symbols in the portion of the modulated carrier signal or a number of symbols in the portion of the modulated carrier signal having a magnitude error that is greater than a predefined threshold. Such other characteristics may also include, but are not limited to, a sum of a phase error associated with the symbols in the portion of the modulated carrier signal, an average of the phase error, or a number of symbols in the portion of the modulated carrier signal having a phase error that is greater than a predefined threshold. The manner in which such characteristics may be identified is more fully described in commonly-owned U.S. Pat. No. 7,398,452 to Kim et al, issued Jul. 8, 2008, the entirety of which is incorporated by reference herein.

2. Example Implementation of BEC Logic

Figure 9:
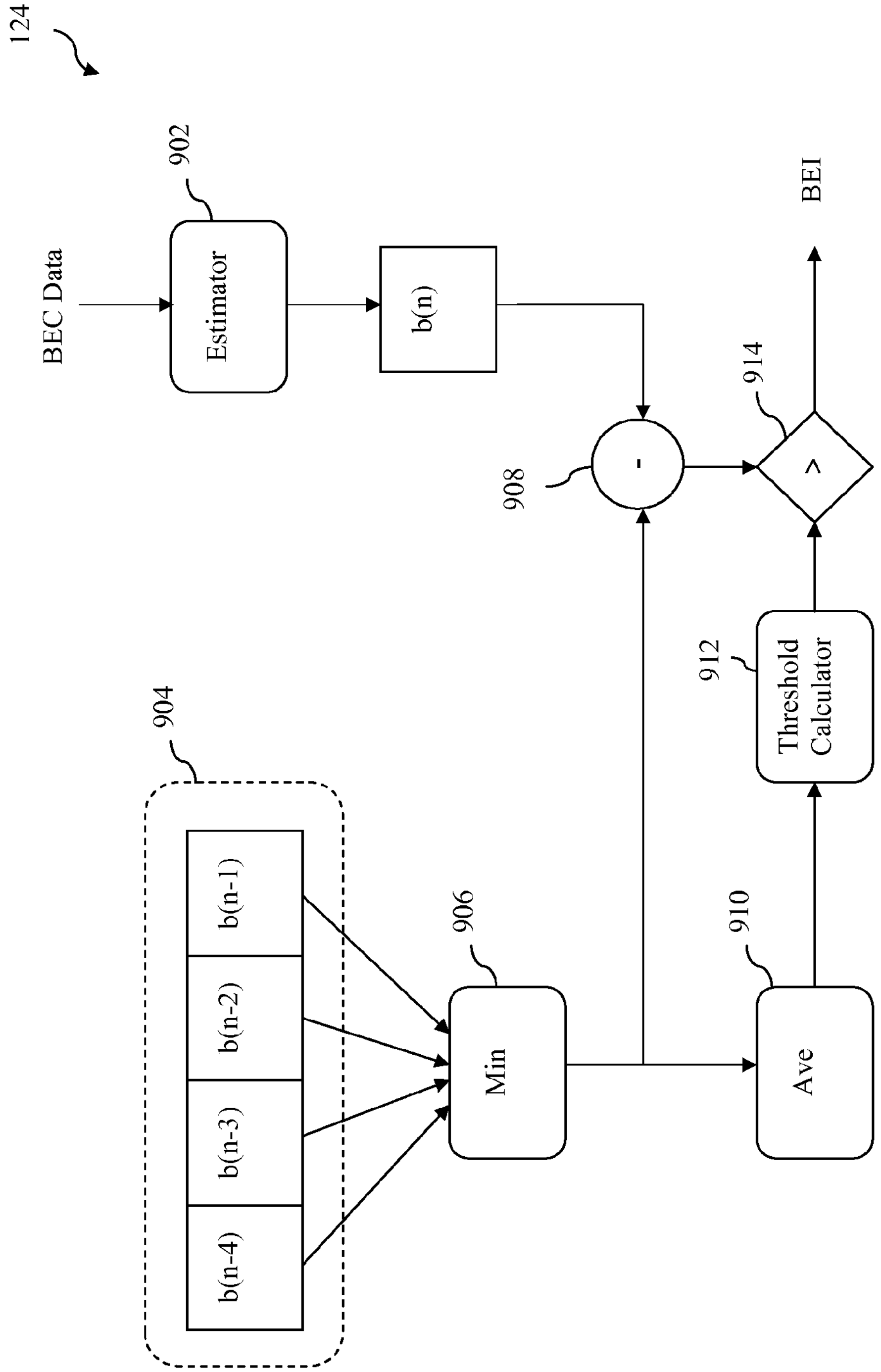
FIG. 9 is a block diagram of BEC logic in accordance with one embodiment of the present invention.

As discussed above in reference to system 100 of FIG. 1, BEC logic 124 is configured to use data provided by BEC data generator 132 to estimate a number of bit errors present in a series of encoded bits representative of a portion of the audio signal and to use the estimated number of bit errors to determine whether or not bit errors sufficient to cause an audible artifact have impacted the series of encoded bits. FIG. 9 is a block diagram of an implementation of BEC logic 124 in accordance with one embodiment of the present invention. This implementation is described herein by way of example only and is not intended to limit the present invention.

As shown in FIG. 9, the implementation of BEC logic 124 includes an estimator 902, a buffer 904, a first logic block 906, a subtractor 908, a second logic block 910, a threshold calculator 912, and decision logic 914. Each of these elements will now be described.

Estimator 902 is configured to receive data associated with a portion of a modulated carrier signal from BEC data generator 132 and to determine an estimated number of bit errors based on the data, denoted b(n). As noted in the preceding section, the data received from BEC data generator 132 may include but is not limited to an estimated magnitude variance associated with the portion of the modulated carrier signal or an estimated phase error variance associated with the portion of the modulated carrier signal, although the data may represent other characteristics associated with the portion of the modulated carrier signal.

One possible implementation of BEC logic 124 in accordance with the present invention may determine whether or not bit errors sufficient to cause an audible artifact have occurred based on comparing the estimated number of bit errors, b(n), to a predetermined threshold. However, such an implementation could trigger the performance of packet loss concealment by PLC block 118 for an extended series of packets received in a random bit error environment that causes the estimated number of bit errors associated with each of the packets to marginally exceed the threshold. Since a great number of PLC techniques are based on extrapolation of the decoded audio waveform preceding packet loss, extended performance of PLC across the series of packets could result in substantial degradation of the quality of the audio output signal.

To address this issue, the implementation of BEC logic 124 shown in FIG. 9 does not compare the estimated number of bit errors, b(n), to a predetermined threshold to determine if bit errors sufficient to cause an audible artifact have occurred but instead compares a difference between the estimated number of bit errors, b(n), and an estimated number of bit errors associated with one or more previously-received portions of the modulated carrier signal to a predetermined threshold to determine if bit errors sufficient to cause an audible artifact have occurred. Thus, a relative increase in the estimated bit errors is used to determine whether bit errors sufficient to cause an audible artifact have occurred.

As shown in FIG. 9, this approach is implemented by maintaining a buffer 904 of the estimated number of bit errors associated with a plurality of previously-received portions of the modulated carrier signal, denoted b(n−4), b(n−3), b(n−2) and b(n−1). Although four estimates are maintained in buffer 904, persons skilled in the relevant art(s) will appreciate that any number of estimates associated with previously-received portions of the modulated carrier signal may be buffered in accordance with various embodiments of the present invention. First logic block 906 is configured to select the minimum estimated number of bit errors from among the buffered estimates b(n−4), b(n−3), b(n−2) and b(n−1) and subtractor 908 is configured to subtract this number from the estimated number of bit errors associated with the current portion of the modulated carrier signal b(n). The difference generated by subtractor 908 is then provided to decision logic 914 for comparison to a threshold. If the difference exceeds the threshold, then decision logic 914 asserts the BEI signal thereby indicating that bit errors sufficient to cause an audible artifact have occurred. If the difference does not exceed the threshold, then decision logic 914 negates the BEI signal thereby indicating that bit errors sufficient to cause an audible artifact have not occurred.

In accordance with the implementation depicted in FIG. 9, the threshold used by decision logic 914 is adaptively determined for each series of encoded bits for which the number of bit errors are estimated. In particular, second logic block 910 maintains a running average of the minimum estimated number of bit errors selected by first logic block 906 and threshold calculator 912 calculates the threshold used by decision logic 914 based on the running average. In one embodiment, the threshold calculated by threshold calculator varies between 5 and 8 bit errors depending on the running average, although this is only an example. In a further embodiment, the threshold increases as the running average increases.

This approach may be used to account for the fact that the threshold number of estimated bit errors at which packet loss concealment may generate better results than audio decoding may vary depending on the degree to which the wireless link introduces bit errors sufficient to cause audible artifacts. In particular, it has been observed with respect to one implementation that uses CVSD decoding that the threshold number of estimated bit errors at which packet loss concealment generates better results than audio decoding is lower when the wireless link introduces a first percentage of bursty bit errors and higher when the wireless link introduces a second percentage of bursty bit errors that is greater than the first percentage of bursty bit errors.

C. Example Bit Error Concealment Methods

Example methods for performing bit error concealment in accordance with various embodiments of the present invention will now be described in reference to flowcharts depicted in FIGS. 10-17. The methods described in reference to these figures may be implemented, for example, by the various embodiments of system 100 as described above in reference to FIGS. 1-9. However, the methods are not limited to those embodiments and may be performed by other systems.

Figure 10:
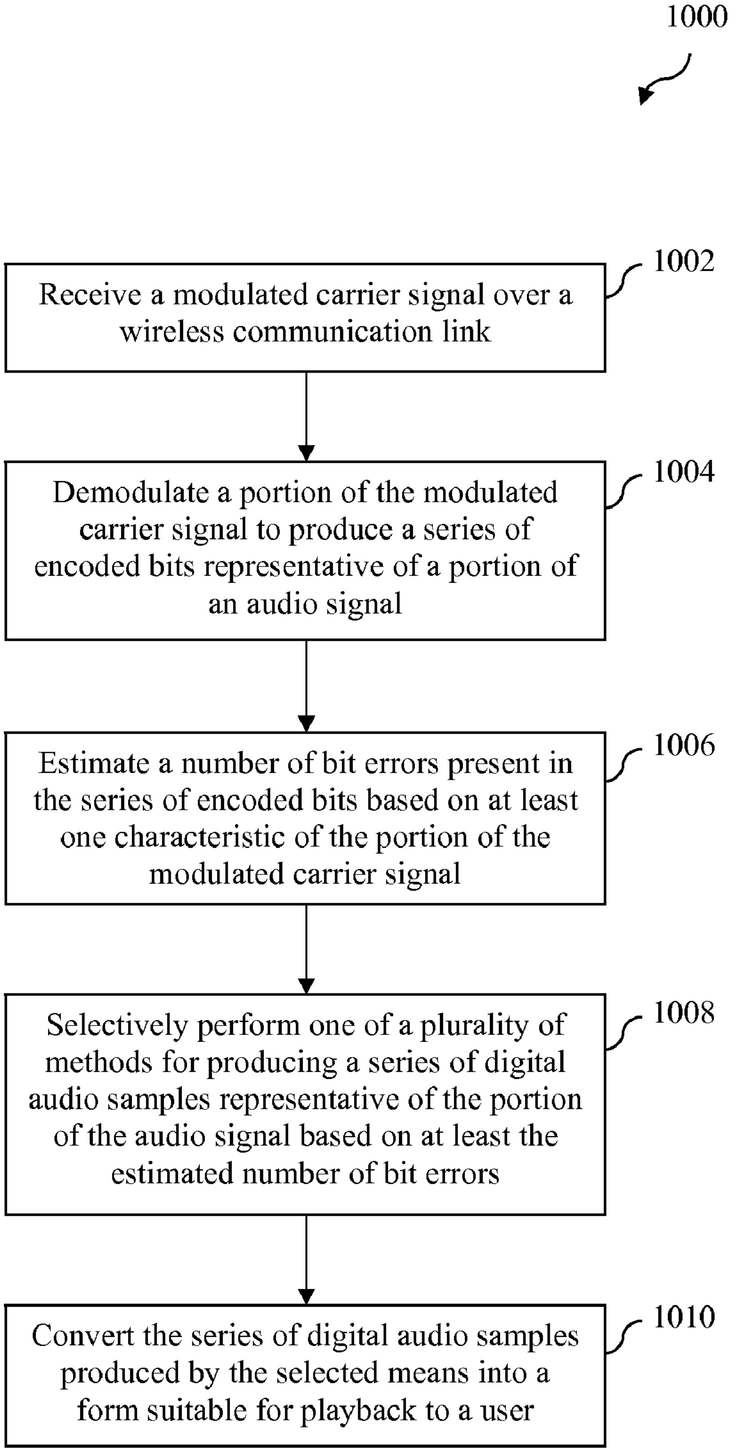
FIG. 10 depicts a flowchart of a method for performing bit error concealment in accordance with an embodiment of the present invention.

In particular, FIG. 10 depicts a flowchart 1000 of a method for performing bit error concealment in accordance with an embodiment of the present invention. As shown in FIG. 10, the method of flowchart 1000 begins at step 1002, in which a modulated carrier signal is received over a wireless communication link. The modulated carrier signal may comprise for example, a GFSK- or DPSK-modulated carrier signal received over a Bluetooth® wireless communication link.

At step 1004, a portion of the modulated carrier signal is demodulated to produce a series of encoded bits representative of a portion of an audio signal. The series of encoded bits representative of the portion of the audio signal may comprise, for example, a frame of bits encoded in accordance with a CVSD encoding technique. The demodulation technique applied to produce the series of encoded bits may comprise, for example, a GFSK or DPSK demodulation technique.

At step 1006, a number of bit errors present in the series of encoded bits is estimated based on at least one characteristic of the portion of the modulated character signal.

At step 1008, one of a plurality of methods for producing a series of digital audio samples representative of the portion of the audio signal is selectively performed based on at least the estimated number of bit errors. For example, in one embodiment, one of the following two methods is selected to produce the series of digital audio samples based on at least the estimated number of bit errors: (1) the series of digital audio samples is obtained from an audio decoder, wherein such samples were produced based on the decoding of the series of encoded bits; or (2) a packet loss concealment algorithm is performed to produce the series of digital audio samples. The method that is selected is intended to produce the best output audio quality in light of the estimated number of bit errors. Note that other methods for producing the series of digital audio samples may be used depending upon the implementation. Furthermore, certain other factors may also be taken into account in determining which method to apply. Such factors may include, for example, whether a packet that includes the series of encoded bits is deemed lost or whether or not a packet payload that includes the series of encoded bits passes a CRC.

At step 1010, the series of digital audio samples produced by the selected method is converted into a form suitable for playback to a user. This step may involve, for example, passing the series of digital audio samples through a D/A converter to convert the series of digital audio samples into a corresponding analog audio signal.

Figure 11:
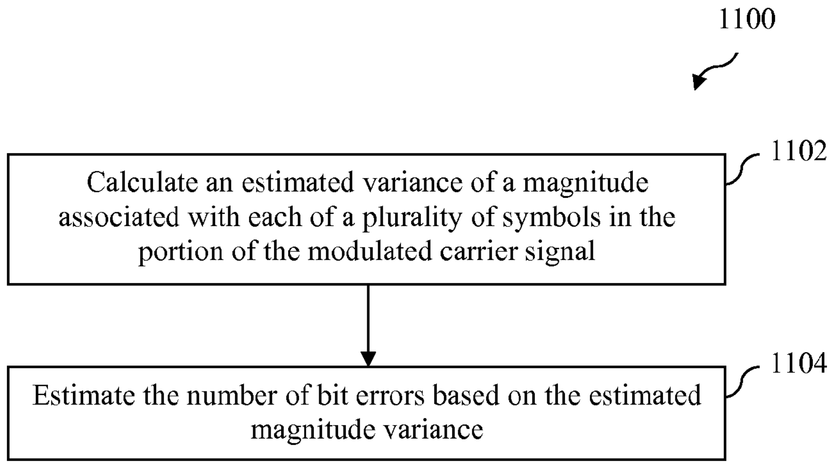
FIG. 11 depicts a flowchart of a method for estimating a number of bit errors present in a series of encoded bits based on at least one characteristic of a portion of a modulated carrier signal that was demodulated to produce the series of encoded bits in accordance with an embodiment of the present invention.

FIG. 11 depicts a flowchart 1100 of a method for estimating a number of bit errors present in a series of encoded bits based on at least one characteristic of a portion of a modulated carrier signal that was demodulated to produce the series of encoded bits in accordance with an embodiment of the present invention. The method of flowchart 1100 may be implemented, for example, to perform step 1006 of the method of flowchart 1000 as described above in reference to FIG. 10.

As shown in FIG. 11, the method of flowchart 1100 begins at step 1102, in which an estimated variance of a magnitude associated with each of a plurality of symbols in the portion of the modulated carrier signal is calculated. At step 1104, the number of bit errors is estimated based on the estimated magnitude variance.

Figure 12:
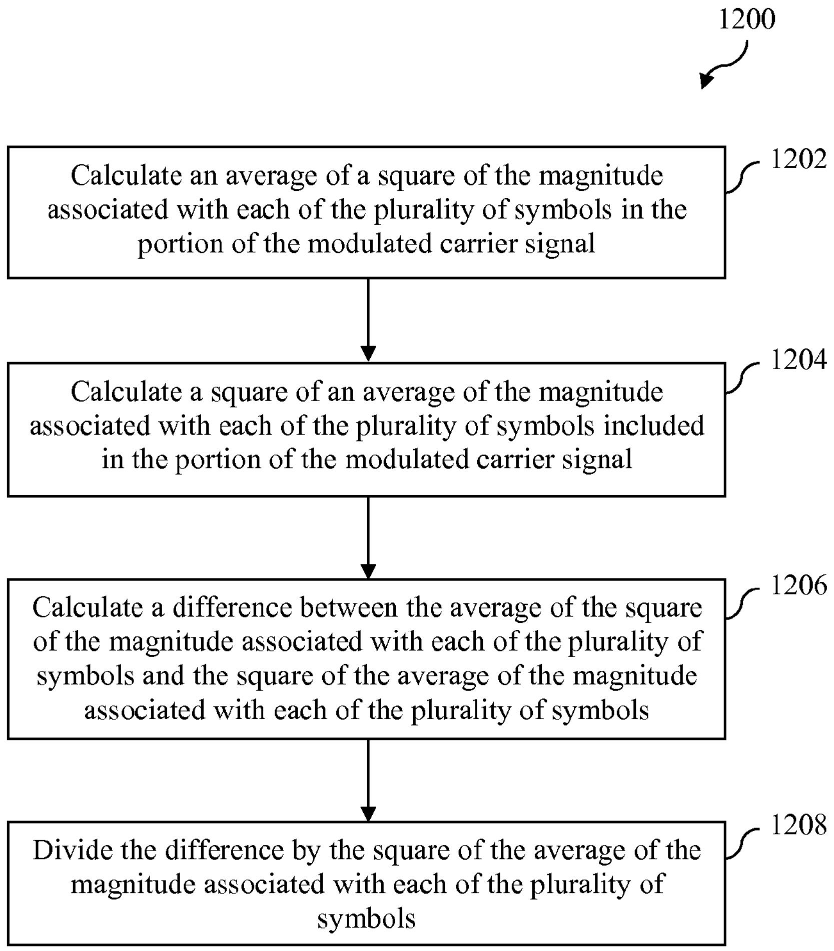
FIG. 12 depicts a flowchart of one method for calculating an estimated variance of a magnitude associated with each of a plurality of symbols in a portion of a modulated carrier signal in accordance with an embodiment of the present invention.

FIG. 12 depicts a flowchart 1200 of one method for calculating an estimated variance of a magnitude associated with each of a plurality of symbols in a portion of a modulated carrier signal in accordance with an embodiment of the present invention. The method of flowchart 1200 may be implemented, for example, to perform step 1102 of the method of flowchart 1100 as described above in reference to FIG. 11.

As shown in FIG. 12, the method of flowchart 1200 begins at step 1202 in which an average of a square of the magnitude associated with each of the plurality of symbols in the portion of the modulated carrier signal is calculated.

At step 1204, a square of an average of the magnitude associated with each of the plurality of symbols included in the portion of the modulated carrier signal is calculated.

At step 1206, a difference is calculated between the average of the square of the magnitude associated with each of the plurality of symbols in the portion of the modulated carrier signal and the square of the average of the magnitude associated with each of the plurality of symbols included in the portion of the modulated carrier signal. This step may be thought of as producing an estimated magnitude variance.

At step 1208, the difference calculated during step 1206 is divided by the square of the average of the magnitude associated with each of the plurality of symbols included in the portion of the modulated carrier signal. This step may be thought of as producing a normalized version of the estimated magnitude variance.

Figure 13:
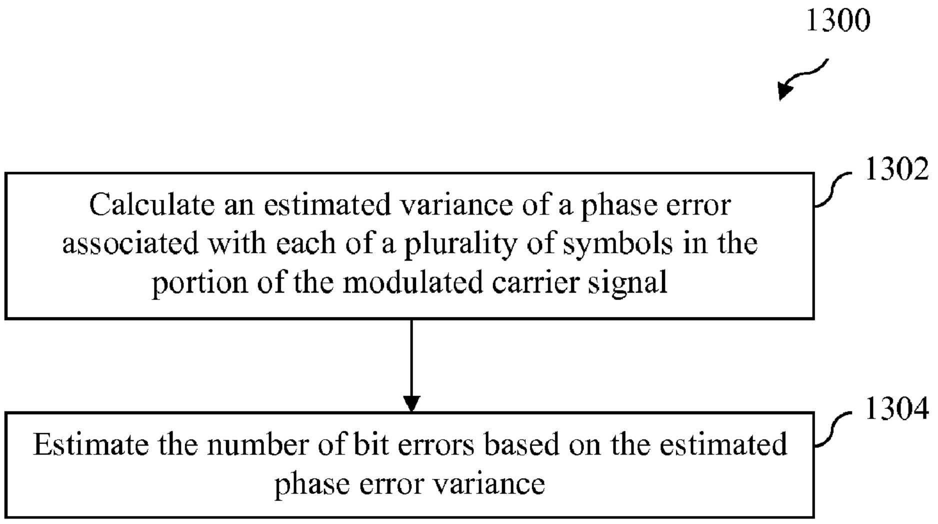
FIG. 13 depicts a flowchart of an alternate method for estimating a number of bit errors present in a series of encoded bits based on at least one characteristic of a portion of a modulated carrier signal that was demodulated to produce the series of encoded bits in accordance with an embodiment of the present invention.

FIG. 13 depicts a flowchart 1300 of an alternate method for estimating a number of bit errors present in a series of encoded bits based on at least one characteristic of a portion of a modulated carrier signal that was demodulated to produce the series of encoded bits in accordance with an embodiment of the present invention. Like the method of flowchart 1100 described above in reference to FIG. 11, the method of flowchart 1300 may be implemented to perform step 1006 of the method of flowchart 1000 as described above in reference to FIG. 10.

As shown in FIG. 13, the method of flowchart 1300 begins at step 1302, in which an estimated variance of a phase error associated with each of a plurality of symbols in the portion of the modulated carrier signal is calculated. At step 1304, the number of bit errors is estimated based on the estimated phase error variance.

Figure 14:
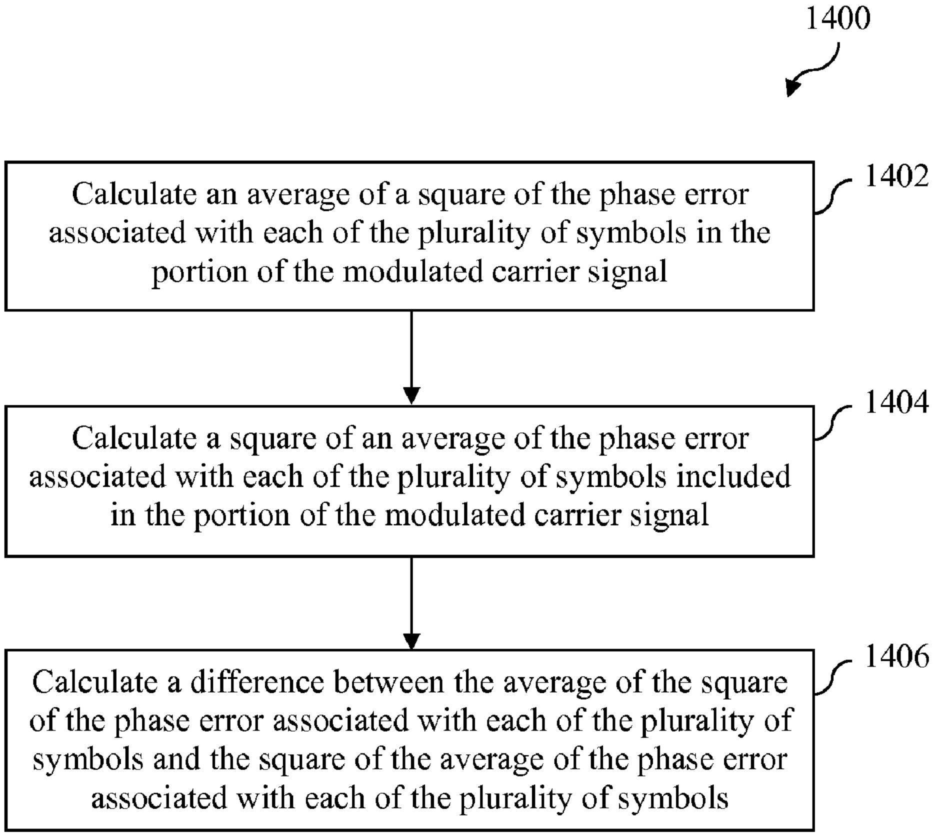
FIG. 14 depicts a flowchart of one method for calculating an estimated variance of a phase error associated with each of a plurality of symbols in a portion of a modulated carrier signal in accordance with an embodiment of the present invention.

FIG. 14 depicts a flowchart 1400 of one method for calculating an estimated variance of a phase error associated with each of a plurality of symbols in a portion of a modulated carrier signal in accordance with an embodiment of the present invention. The method of flowchart 1400 may be implemented, for example, to perform step 1302 of the method of flowchart 1300 as described above in reference to FIG. 13.

As shown in FIG. 14, the method of flowchart 1400 begins at step 1402 in which an average of a square of the phase error associated with each of the plurality of symbols in the portion of the modulated carrier signal is calculated.

At step 1404, a square of an average of the phase error associated with each of the plurality of symbols included in the portion of the modulated carrier signal is calculated.

At step 1406, a difference is calculated between the average of the square of the phase error associated with each of the plurality of symbols in the portion of the modulated carrier signal and the square of the average of the phase error associated with each of the plurality of symbols included in the portion of the modulated carrier signal. This step may be thought of as producing an estimated phase error variance.

Figure 15:
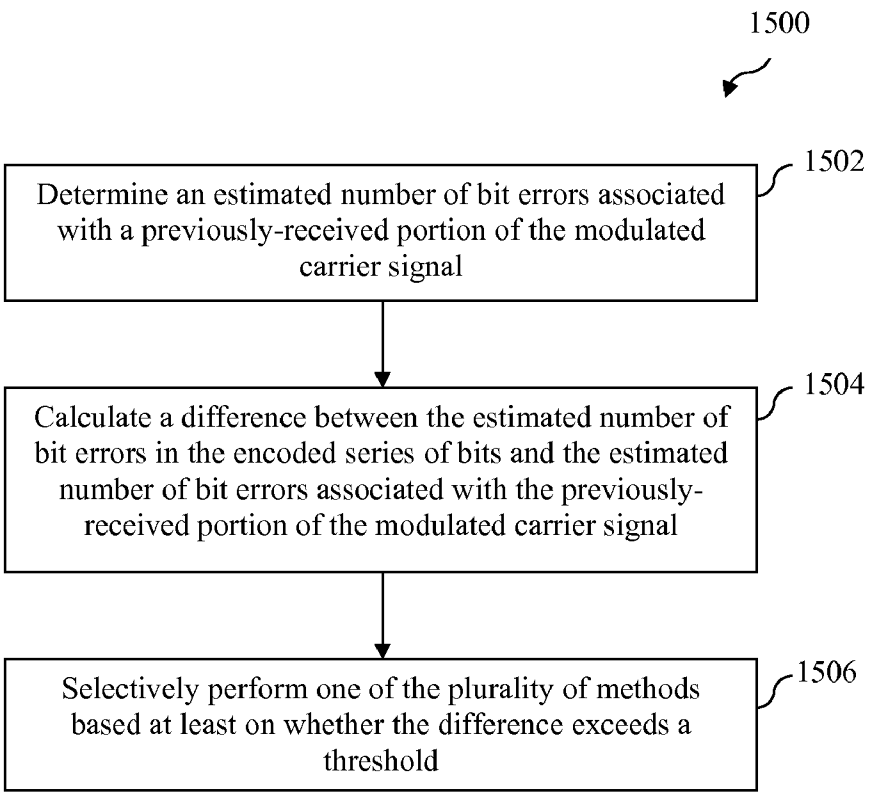
FIG. 15 depicts a flowchart of a method for selectively performing one of a plurality of methods for producing a series of digital audio samples representative of a portion of an audio signal based on at least an estimated number of bit errors in a series of encoded bits representative of the portion of the audio signal in accordance with an embodiment of the present invention.

FIG. 15 depicts a flowchart 1500 of a method for selectively performing one of a plurality of methods for producing a series of digital audio samples representative of a portion of an audio signal based on at least an estimated number of bit errors in a series of encoded bits representative of the portion of the audio signal in accordance with an embodiment of the present invention. The method of flowchart 1500 may be implemented, for example, to perform step 1008 of flowchart 1000 as described above in reference to FIG. 10.

As shown in FIG. 15, the method of flowchart 1500 begins at step 1502 in which an estimated number of bit errors associated with a previously-received portion of a modulated carrier signal is determined. For example, in one embodiment, the estimated number of bit errors associated with the previously-received portion of the modulated carrier signal is determined by identifying the minimum estimated number of bit errors from among a plurality of estimated numbers of bit errors associated with a corresponding plurality of previously-received portions of the modulated carrier signal.

At step 1504, a difference is calculated between the estimated number of bit errors in the series of encoded bits and the estimated number of bit errors associated with the previously-received portion of the modulated carrier signal.

At step 1506, one of the plurality of methods for producing the series of digital audio samples representative of the portion of an audio signal is selectively performed based at least on whether the difference calculated in step 1504 exceeds a threshold.

Figure 16:
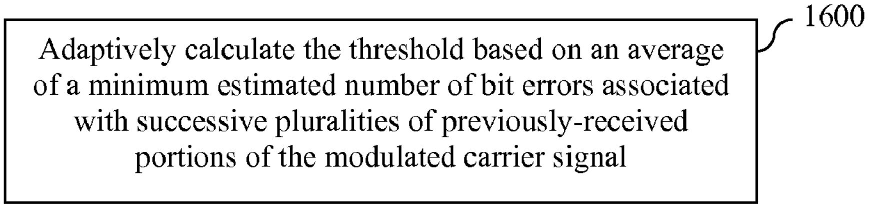
FIG. 16 depicts a step that may be performed in conjunction with the method of the flowchart depicted in FIG. 15.

FIG. 16 depicts a step 1600 that may be performed in conjunction with the method of flowchart 1500 in order to determine the threshold used in step 1506. In particular, in step 1600, the threshold used in step 1506 is adaptively calculated based on an average of a minimum estimated number of bit errors associated with successive pluralities of previously-received portions of the modulated carrier signal.

Embodiments of the invention described above use one or more characteristics associated with a portion of a modulated carrier signal to estimate a number of bit errors in a series of encoded bits that represent a portion of an audio signal and that were obtained from demodulating the portion of the modulated carrier signal. However, depending upon the implementation, the characteristic(s) associated with the portion of the modulated carrier signal may additionally or alternatively be used to estimate the location and/or distribution of the bit errors in the series of encoded bits. This additional information can also be used to determine which of a plurality of methods is best to use for producing a series of digital audio samples representative of the portion of the audio signal.

Figure 17:
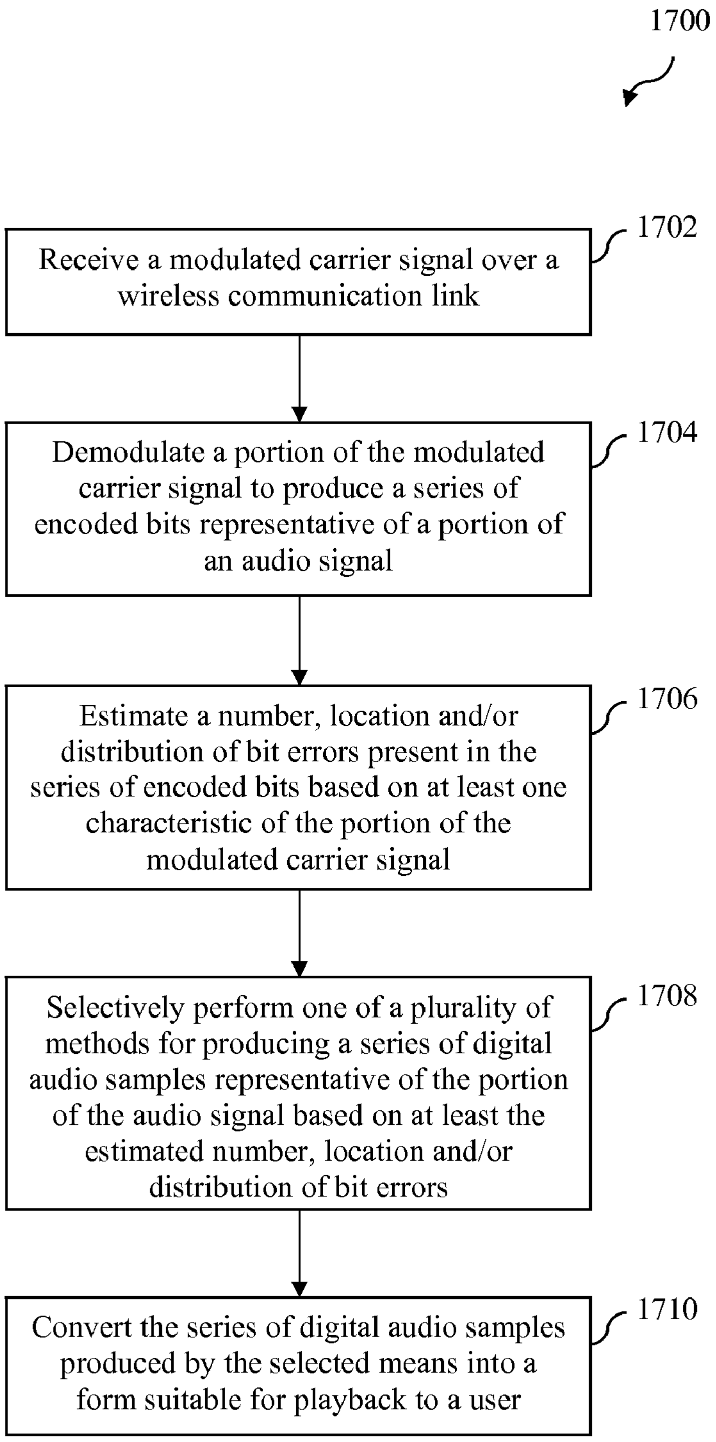
FIG. 17 depicts a flowchart of an alternative method for performing bit error concealment in accordance with an embodiment of the present invention.

This implementation is further described in reference to flowchart 1700 of FIG. 17. In particular, FIG. 17 depicts a flowchart 1700 of an alternative method for performing bit error concealment in accordance with an embodiment of the present invention. As shown in FIG. 17, the method of flowchart 1700 begins at step 1702, in which a modulated carrier signal is received over a wireless communication link. At step 1704, a portion of the modulated carrier signal is demodulated to produce a series of encoded bits representative of a portion of an audio signal. At step 1706, a number, location and/or distribution of bit errors present in the series of encoded bits is estimated based on at least one characteristic of the portion of the modulated character signal. At step 1708, one of a plurality of methods for producing a series of digital audio samples representative of the portion of the audio signal is selectively performed based on at least the estimated number, location and/or distribution of bit errors. At step 1710, the series of digital audio samples produced by the selected method is converted into a form suitable for playback to a user.

D. Example Computer System Implementation

Depending upon the implementation, various elements of system 100 (described above in reference to FIGS. 1-9) as well as various steps of flowcharts 1000, 1100, 1200, 1300, 1400, 1500, 1600, and 1700 (described above in reference to FIGS. 10-17, respectively) may be implemented in hardware using analog and/or digital circuits, in software, through the execution of instructions by one or more general purpose or special-purpose processors, or as a combination of hardware and software. An example of a computer system 1800 that may be used to execute certain software-implemented features of these systems and methods is depicted in FIG. 18.

Figure 18:
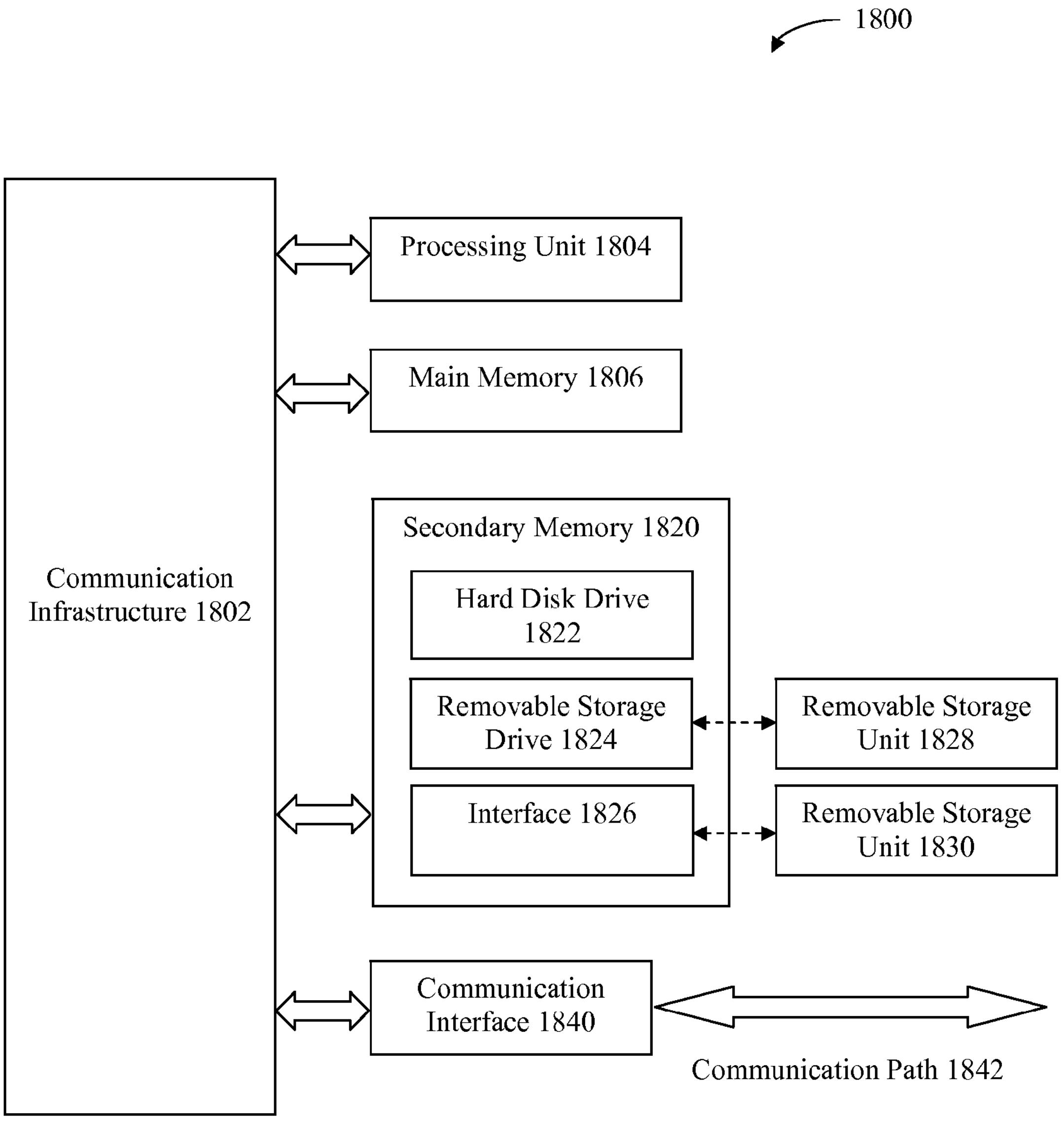
FIG. 18 depicts a computer system that may be used to implement aspects of the present invention.

As shown in FIG. 18, computer system 1800 includes a processing unit 1804 that includes one or more processors. Processing unit 1804 is connected to a communication infrastructure 1802, which may comprise, for example, one or more buses or networks.

Computer system 1800 also includes a main memory 1806, preferably random access memory (RAM), and may also include a secondary memory 1820. Secondary memory 1820 may include, for example, a hard disk drive 1822, a removable storage drive 1824, and/or a memory stick. Removable storage drive 1824 may comprise a floppy disk drive, a magnetic tape drive, an optical disk drive, a flash memory, or the like. Removable storage drive 1824 reads from and/or writes to a removable storage unit 1828 in a well-known manner. Removable storage unit 1828 may comprise a floppy disk, magnetic tape, optical disk, or the like, which is read by and written to by removable storage drive 1824. As will be appreciated by persons skilled in the relevant art(s), removable storage unit 1828 includes a computer usable storage medium having stored therein computer software and/or data.

In alternative implementations, secondary memory 1820 may include other similar means for allowing computer programs or other instructions to be loaded into computer system 1800. Such means may include, for example, a removable storage unit 1830 and an interface 1826. Examples of such means may include a program cartridge and cartridge interface (such as that found in video game devices), a removable memory chip (such as an EPROM, or PROM) and associated socket, and other removable storage units 1830 and interfaces 1826 which allow software and data to be transferred from the removable storage unit 1830 to computer system 1800.

Computer system 1800 may also include a communication interface 1840. Communication interface 1840 allows software and data to be transferred between computer system 1800 and external devices. Examples of communication interface 1840 may include a modem, a network interface (such as an Ethernet card), a communications port, a PCMCIA slot and card, or the like. Software and data transferred via communication interface 1840 are in the form of signals which may be electronic, electromagnetic, optical, or other signals capable of being received by communication interface 1840. These signals are provided to communication interface 1840 via a communication path 1842. Communications path 1842 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 1828, removable storage unit 1830 and a hard disk installed in hard disk drive 1822. Computer program medium and computer readable medium can also refer to memories, such as main memory 1806 and secondary memory 1820, which can be semiconductor devices (e.g., DRAMs, etc.). These computer program products are means for providing software to computer system 1800.

Computer programs (also called computer control logic, programming logic, or logic) are stored in main memory 1806 and/or secondary memory 1820. Computer programs may also be received via communication interface 1840. Such computer programs, when executed, enable computer system 1800 to implement features of the present invention as discussed herein. Accordingly, such computer programs represent controllers of computer system 1800. Where the invention is implemented using software, the software may be stored in a computer program product and loaded into computer system 1800 using removable storage drive 1824, interface 1826, or communication interface 1840.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

E. Conclusion

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:

demodulating, by a demodulator, a portion of a modulated carrier signal received over a communication link to produce a series of encoded bits representative of a portion of an audio signal;

estimating a number of bit errors present in the series of encoded bits based on at least one characteristic of the portion of the modulated carrier signal;

selectively performing one of a plurality of methods for producing a series of digital audio samples representative of the portion of the audio signal based on at least the estimated number of bit errors; and converting, by a digital-to-analog converter, the series of digital audio samples produced by the selected method into an analog audio signal for playback to a user.

2. The method of claim 1, wherein the portion of the modulated carrier signal is modulated in accordance with a constant-envelope modulation technique and wherein estimating the number of bit errors present in the series of encoded bits based on at least one characteristic of the portion of the modulated carrier signal comprises:

calculating an estimated variance of a magnitude associated with each of a plurality of symbols in the portion of the modulated carrier signal; and estimating the number of bit errors based on the estimated variance.

3. The method of claim 2, wherein calculating the estimated variance of the magnitude associated with each of the plurality of symbols in the portion of the modulated carrier signal comprises:

calculating a difference between an average of a square of the magnitude associated with each of the plurality of symbols in the portion of the modulated carrier signal and a square of an average of the magnitude associated with each of the plurality of symbols included in the portion of the modulated carrier signal.

4. The method of claim 3, wherein calculating the estimated variance of the magnitude associated with each of the plurality of symbols in the portion of the modulated carrier signal further comprises:

dividing the difference by the square of the average of the magnitude associated with each of the plurality of symbols included in the portion of the modulated carrier signal.

5. The method of claim 1, wherein the portion of the modulated carrier signal is modulated in accordance with a phase shift keying modulation technique and wherein estimating the number of bit errors present in the series of encoded bits based on at least one characteristic of the portion of the modulated carrier signal comprises:

calculating an estimated variance of a phase error associated with each of a plurality of symbols in the portion of the modulated carrier signal; and estimating the number of bit errors based on the estimated variance.

6. The method of claim 5, wherein calculating the estimated variance of the phase error associated with each of the plurality of symbols in the portion of the modulated carrier signal comprises:

calculating a difference between an average of a square of the phase error associated with each of the plurality of symbols in the portion of the modulated carrier signal and a square of an average of the phase error associated with each of the plurality of symbols included in the portion of the modulated carrier signal.

7. The method of claim 1, wherein selectively performing one of a plurality of methods for producing a series of digital audio samples representative of the portion of the audio signal based on at least the estimated number of bit errors comprises selectively performing one of:

obtaining samples generated by an audio decoder during decoding of the encoded bit stream for use as the series of digital audio samples; or performing a packet loss concealment algorithm to produce the series of digital audio samples.

8. The method of claim 1, wherein selectively performing one of a plurality of methods for producing a series of digital audio samples representative of the portion of the audio signal based on at least the estimated number of bit errors comprises:

determining if a difference between the estimated number of bit errors and an estimated number of bit errors associated with a previously-received portion of the modulated carrier signal exceeds a threshold; and selectively performing one of the plurality of methods based at least on whether or not the difference exceeds the threshold.

9. The method of claim 8, further comprising:

determining the estimated number of bit errors associated with the previously-received portion of the modulated carrier signal by selecting a minimum of an estimated number of bit errors associated with each of a plurality of previously-received portions of the modulated carrier signal.

10. The method of claim 8, further comprising:

adaptively calculating the threshold based on an average of a minimum estimated number of bit errors associated with successive pluralities of previously-received portions of the modulated carrier signal.

11. A system comprising:

a demodulator configured to demodulate a portion of a modulated carrier signal received over a communication link to produce a series of encoded bits representative of a portion of an audio signal;

a data generator configured to determine at least one characteristic of the portion of the modulated carrier signal;

bit error concealment logic configured to estimate a number of bit errors present in the series of encoded bits based on the at least one characteristic of the portion of the modulated carrier signal and to selectively assert or negate an indicator signal based on the estimated number of bit errors;

selection logic configured to select one of a plurality of means for producing a series of digital audio samples representative of the portion of the audio signal based on at least a state of the indicator signal; and a digital-to-analog converter configured to convert the series of digital audio samples produced by the selected means into an analog audio signal for playback to a user.

12. The system of claim 11, wherein the portion of the modulated carrier signal is modulated in accordance with a constant-envelope modulation technique, wherein the data generator is configured to calculate an estimated variance of a magnitude associated with each of a plurality of symbols in the portion of the modulated carrier signal, and wherein the bit error concealment logic is configured to estimate the number of bit errors based on the estimated variance.

13. The system of claim 12, wherein the data generator is configured to calculate the estimated variance by calculating a difference between an average of a square of the magnitude associated with each of the plurality of symbols in the portion of the modulated carrier signal and a square of an average of the magnitude associated with each of the plurality of symbols included in the portion of the modulated carrier signal.

14. The system of claim 13, wherein the data generator is further configured to calculate the estimated variance by dividing the difference by the square of the average of the magnitude associated with each of the plurality of symbols included in the portion of the modulated carrier signal.

15. The system of claim 11, wherein the portion of the modulated carrier signal is modulated in accordance with a phase shift keying modulation technique, wherein the data generator is configured to calculate an estimated variance of a phase error associated with each of a plurality of symbols in the portion of the modulated carrier signal, and wherein the bit error concealment logic is configured to estimate the number of bit errors based on the estimated variance.

16. The system of claim 15, wherein the data generator is configured to calculate the estimated variance by calculating a difference between an average of a square of the phase error associated with each of the plurality of symbols in the portion of the modulated carrier signal and a square of an average of the phase error associated with each of the plurality of symbols included in the portion of the modulated carrier signal.

17. The system of claim 11, wherein the plurality of means for producing the series of digital audio samples representative of the portion of the audio signal based on at least the estimated number of bit errors comprises:

means for obtaining samples generated by an audio decoder during decoding of the encoded bit stream for use as the series of digital audio samples; or means for performing a packet loss concealment algorithm to produce the series of digital audio samples.

18. The system of claim 11, wherein the bit error concealment logic is configured to determine whether to assert or negate the indicator signal by determining if a difference between the estimated number of bit errors and an estimated number of bit errors associated with a previously-received portion of the modulated carrier signal exceeds a threshold.

19. The system of claim 18, wherein the bit error concealment logic is further configured to determine the estimated number of bit errors associated with the previously-received portion of the modulated carrier signal by selecting a minimum of an estimated number of bit errors associated with each of a plurality of previously-received portions of the modulated carrier signal.

20. The system of claim 18, wherein the bit error concealment logic is further configured to adaptively calculate the threshold based on an average of a minimum estimated number of bit errors associated with successive pluralities of previously-received portions of the modulated carrier signal.

21. A method, comprising:

demodulating, by a demodulator, a portion of a modulated carrier signal received over a communication link to produce a series of encoded bits representative of a portion of an audio signal;

estimating a number, location and/or distribution of bit errors present in the series of encoded bits based on at least one characteristic of the portion of the modulated carrier signal;

selectively performing one of a plurality of methods for producing a series of digital audio samples representative of the portion of the audio signal based on at least the estimated number, location and/or distribution of bit errors; and converting, by a digital-to-analog converter, the series of digital audio samples produced by the selected method into an analog audio signal for playback to a user.

* * * * *